US007923959B2

(12) United States Patent
Imai et al.

(10) Patent No.: US 7,923,959 B2
(45) Date of Patent: Apr. 12, 2011

(54) ROTOR DRIVING CONTROL DEVICE AND IMAGE FORMING APPARATUS

(75) Inventors: Satoshi Imai, Atsugi (JP); Hiroshi Koide, Yamato (JP); Yasunari Kawashima, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 872 days.

(21) Appl. No.: 11/587,922

(22) PCT Filed: Apr. 25, 2005

(86) PCT No.: PCT/JP2005/008320
§ 371 (c)(1),
(2), (4) Date: Sep. 21, 2007

(87) PCT Pub. No.: WO2005/104344
PCT Pub. Date: Nov. 3, 2005

(65) Prior Publication Data

US 2008/0231223 A1 Sep. 25, 2008

(30) Foreign Application Priority Data

Apr. 26, 2004 (JP) ................................ 2004-129906

(51) Int. Cl.
*H02P 23/00* (2006.01)
*H02P 25/00* (2006.01)

(52) U.S. Cl. ........................................ 318/799; 318/683

(58) Field of Classification Search .................. 318/799, 318/683
See application file for complete search history.

(56) References Cited

U.S. PATENT DOCUMENTS

| | | | | | |
|---|---|---|---|---|---|
| 4,223,261 | A * | 9/1980 | White | ........................... | 318/721 |
| 4,228,396 | A * | 10/1980 | Palombo et al. | .............. | 324/163 |
| 7,536,135 | B2 * | 5/2009 | Imai | .............................. | 399/167 |
| 2003/0210932 | A1 * | 11/2003 | Koide et al. | .................... | 399/302 |
| 2007/0126837 | A1 * | 6/2007 | Takahashi et al. | ............ | 347/104 |

FOREIGN PATENT DOCUMENTS

| | | |
|---|---|---|
| JP | 08 010372 | 1/1996 |
| JP | 2000 137424 | 5/2000 |
| JP | 2000 356929 | 12/2000 |
| JP | 2001 054296 | 2/2001 |
| JP | 2001 078474 | 3/2001 |
| JP | 2001 359294 | 12/2001 |
| JP | 2002 072816 | 3/2002 |
| JP | 2002 244395 | 8/2002 |
| JP | 2003 066676 | 3/2003 |
| JP | 2004 069801 | 3/2004 |
| JP | 2005 094987 | 4/2005 |

* cited by examiner

*Primary Examiner* — Bentsu Ro
*Assistant Examiner* — Erick Glass
(74) *Attorney, Agent, or Firm* — Oblon, Spivak, McClelland, Maier & Neustadt, L.L.P.

(57) ABSTRACT

A device of a motor with a rotation control means that decreases the fluctuation of its rotation period. The control is carried out based on the amplitude and the phase generated by amplitude-and-phase generating devices, detecting passage time of detected portions (13) in different zones. And a color image forming apparatus of tandem type with such motors.

14 Claims, 34 Drawing Sheets

ROTOR DRIVING CONTROL DEVICE AND IMAGE FORMING APPARATUS

TECHNICAL FIELD

The present invention relates to a rotor driving control device suitable for reducing a rotation period fluctuation of a rotor when rotating and driving the rotor by a motor and the like, and an image forming apparatus having the rotor driving control device.

RELATED ART STATEMENT

FIG. 6 explains an image forming apparatus. FIG. 6 shows a color image forming apparatus such as a four colors tandem type color printer. At first, the structure of FIG. 6 is explained. A controller 5 controls the entire image forming apparatus. Reference numerals 1*a* to 1*d* denote photoconductor drums, respectively. The photoconductor drums 1*a* to 1*d* are formed with latent images of black, cyan, magenta, and yellow, respectively. Desired latent images are formed on the photoconductor drums 1*a* to 1*d* by photolithography machines 2*a* to 2*d*. Motors 6*a* to 6*d* rotate the photoconductor drums 1*a* to 1*d*, respectively. A belt 3 is driven by a driving motor 4, and feeds a transfer paper 7.

Next, the operations of the image forming apparatus shown in FIG. 6 will be explained. When the image formation is started, the transfer paper 7 is fed from a paper feeding unit (not shown) to the belt 3. The transfer paper 7 is transferred by the belt 3, and sequentially fed to the photoconductor drum of each color. At this time, the latent images are formed on the photoconductor drums 1*a* to 1*d* from the above by the photolithography machines 2*a* to 2*d*. Toner is attached to these portions, and then the toner is transferred onto the transfer paper 7 disposed just below the photoconductor drum while the transfer paper 7 being passed. In the image forming apparatus shown in FIG. 6, the photoconductor drums 1*a* to 1*d* of respective colors are driven by DC brushless motors and the like, respectively. However, a displacement of the sub-scanning direction generates in the formed image by the following (i) (ii).

(i) Motor rotation period fluctuation by torque ripple and the like.

(ii) Cumulative pitch error of gear, transmission and driving system error by eccentricity of a rotating axis, etc.

In FIG. 6, for example, transmission mechanisms by a planet gear are adopted between the rotating axes of the photoconductor drums 1*a* to 1*d* and the motors 6*a* to 6*d*, respectively. These errors are not limited to the example shown in FIG. 6, but a displacement of image is generated by the influence similar to an example, which forms a plurality of colors by a revolver method using one photoconductor, and then outputs by superimposing the plurality of colors, and to an example which forms a single color image by one photoconductor.

Currently, the example shown in FIG. 6 capable of outputting an image at high speeds has increasingly become mainstream in a color image forming apparatus. In this example, the displacement of image especially formed by each color causes the displacement of superimposed colors, i.e., color shift; thus, deterioration in image quality remarkably appears.

In the conventional image forming apparatus, several countermeasures are extended in order to improve an image quality. With respect to the rotation period fluctuation of DC servomotor, a control system for giving feedback is used by detecting angular velocity of a motor axis. In addition, with respect to the transmission driving system errors, a method for controlling the rotation of motor 6*a* to 6*d* by the results detected in a rotary encoder provided in an axis of photoconductor drum is used. Furthermore, the maximum eccentric position of gear provided on the axis same as the photoconductor drum axis is detected in a manufacturing process, and then the eccentric positions of the gears provided in the four photoconductor drum axes are adjusted to be incorporated. The color shift was reduced by synchronizing the respective phases of the rotation period fluctuations by the eccentricity.

As a method for reducing a color shift by synchronizing the phases of periodical rotation period fluctuations between a plurality of photoconductor drums, there has been provided with a method for previously providing a reference position in which the phases of rotation period fluctuations relating the photoconductor drums of respective colors become the same, and transferring the same part by rotating and driving to conform the phases of rotation period fluctuations (reference to Japanese Published Examined Application H08-10372 and Japanese Patent Laid-Open 2000-137424). In addition, as described above, there has been provided with a method for adjusting phases by detecting the maximum eccentric position of gear of a plurality photoconductor drum axes, and by performing a high-accuracy axis alignment in the installation in order to reduce a color shift when superimposing a plurality of colors.

Although, the phases of the rotation period fluctuations are matched by the above methods to reduce the influence of color shift by the photoconductor drum rotation period fluctuation, the amplitude value of the rotation period fluctuation is varied by each photoconductor drum. When the images of respective colors are superimposed, the color shifts of pixels are generated by the influence of this amplitude value difference. Namely, even though the phases of the rotation period fluctuations of the photoconductor drums are matched each other to reduce the amount of relative color shift; the color shift is generated by the difference of amplitude value of the rotation period fluctuation. In order to obtain a high-quality output image having a reduced color shift, therefore, it is necessary to reduce the absolute amount of amplitude value. In this case, there has been known that the influence on the displacement of pixels caused by the amplitude value of rotation period fluctuation corresponding to one-revolution of the drum is large compared with the influence on the displacement of pixels caused by the amplitude value of another rotation period fluctuation. This is because the displacement is generated in the two parts such as an exposure position and a transfer position in an image forming process on a photoconductor drum.

There has been proposed an art to analyze amplitude of a rotation period fluctuation, and to detect and control a frequency element of an object to be corrected as a known art to reduce amplitude value of rotation period fluctuation (reference to Japanese Patent Laid-Open 2002-72816). In the art described in Japanese Patent Laid-Open 2002-72816, however, a large number of slits or detecting portions of an encoder for detecting a rotation period fluctuation is required, resulting in increasing the cost of structure.

As a countermeasure for the problem, there has been considered a method for detecting and controlling only the rotation period fluctuation affecting the image quality. For example, there has been proposed a method for controlling a motor. In the method for controlling a motor, a frequency of rotation period fluctuation of a motor axis is analyzed, and the frequency element corresponding to the rotation period fluctuation of the drum axis is calculated by multiplying the frequency element by reduction ratio; thus, a motor is controlled to control uneven rotation based on the calculated result (reference to Japanese Patent Laid-Open 2000-356929).

Moreover, there has been suggested a method for controlling rotation of a motor. In the method, different speeds are provided for a motor to generate the rotation period fluctuation from the time differences passing the same zone to one-revolution period of a rotor, and to control the rotation of the motor based on the result (reference to Japanese Patent Laid-Open 2005-094987).

DISCLOSURE OF INVENTION

Problems to be Solved by the Invention

However, there was a problem that the information actually detected in Japanese Patent Laid-Open 2000-356929 has lowered accuracy since the actually detected information is the rotation speed of the motor axis, and the frequency elements of the motor axis and the drum axis are related only by a geometric relationship.

In Japanese Patent Laid-Open 2005-094987, it is necessary for the motor to apply an angular velocity control of sin-wave in order to detect the rotation period of rotor. In this method, it is necessary to conduct a motor speed control of sin-wave twice, in which the amplitude value and the phase are varied each other, in order to detect the rotation period fluctuation corresponding to one-revolution of the rotor. Therefore, it was impossible to update and control the rotation period fluctuation or corrected information while correcting and controlling.

It is, therefore, an object of the present invention to provide a rotor driving control device capable of effectively curving a rotation period fluctuation of a rotor by accurately detecting the rotation period fluctuation with an inexpensive and simple structure, and an image forming apparatus capable of obtaining a high-quality image by carrying the rotation body driving and controlling device.

Means for Solving Problems

In one embodiment of the present invention, a rotor driving control device comprises a motor, a transfer mechanism for transferring a turning force of the motor, a rotor to be rotated and driven by the turning force of the motor, and connected to the transfer mechanism, a plurality of detected portions circularly disposed around a rotation axis of the rotor, a detector to detect the detected portions, a passage time detecting device configured to detect passage times that a first zone and a second zone pass the detector, based on a signal from the detector at the time of rotating the rotor, when the first zone having two detected portions of the plurality of detected portions on the both ends is set, and the second zone having the detected portions on the both ends and at least one end being different from the detected portion of the first zone is set, a device configured to generate an amplitude and a phase of a rotation period fluctuation regarding a desired period of the rotor based on the passage times detected by the passage time detecting device, and a device configured to control the rotation of the motor to decrease the rotation period fluctuation based on the amplitude and the phase generated by the amplitude and phase generating device.

According to the above structure, the amplitude and phase generating device generates the amplitude and the phase of the rotation period fluctuation corresponding to a desired rotation of the rotor based on the passage times that the first zone and the second zone pass the detector and an average rotating speed of the rotor. The rotation control device controls the rotation of the motor to reduce the rotation period fluctuation based on the generated amplitude and phase.

In one embodiment of the present invention, a rotor driving control device comprises a motor, a transfer mechanism for transferring a turning force of the motor, a rotor to be rotated and driven by the turning force of the motor, and connected to the transfer mechanism, a plurality of detected portions circularly disposed around a rotation axis of the rotor, a detector to detect the detected portions, a passage time detecting device configured to detect passage times that more than one zone pass the detector based on a signal from the detector at the time of rotating the rotor, when a zone having two of the plurality of detected portions on the both ends is set more than one, a device configured to generate an amplitude and a phase of a rotation period fluctuation regarding a desired period of the rotor based on the passage time detected by the passage time detecting device, and a device configured to control the rotation of the motor to decrease the rotation period fluctuation based on the amplitude and the phase generated by the amplitude and phase generating device, wherein the rotation period fluctuation of at least more than one is repeatedly corrected by the passage time detecting device, the amplitude and phase generating device, and the rotation control device.

According to the above structure, when the first desired rotation and the second desired rotation are set to the rotor, for example, the amplitude and phase generating device generates the amplitude and the phase of the rotation period fluctuation corresponding to the first desired rotation at first, and controls the rotation of the motor to reduce the rotation period fluctuation corresponding to the first desired rotation. Then the amplitude and phase generating device generates the amplitude and the phase of the rotation period fluctuation corresponding to the second desired rotation, and controls the rotation of the motor to reduce the rotation period fluctuation corresponding to the second desired rotation.

In one embodiment of the present invention, a rotor driving control device comprises a motor, a transfer mechanism for transferring a turning force of the motor, a rotor to be rotated and driven by the turning force of the motor, and connected to the transfer mechanism, a plurality of detected portions circularly-disposed around a rotation axis of the rotor, a detector to detect the detected portions, a passage time detecting device configured to detect passage times that a first zone and a second zone pass the detector, based on a signal from the detector at the time of rotating the rotor, when the first zone having two detected portions of the plurality of detected portions on the both ends is set, and the second zone having the detected portions on the both ends and at least one end being different from the detected portion of the first zone is set, a device configured to generate an amplitude and a phase of a rotation period fluctuation regarding a desired period of the rotor based on the passage time detected by the passage time detecting device, and a device configured to control the rotation of the motor to change the phase of the rotation period fluctuation based on the phase generated by the amplitude and phase generating device.

According to the above structure, the amplitude and phase device generate the phase of the rotation period fluctuation corresponding to a desired rotation of the rotor based on the passage time that the first zone and the second zone pass the detector and the average rotation speed of the rotor. The rotation control device controls the rotation of the motor to match the phase of this rotation period fluctuation to the phase of the rotation period fluctuation generating in another rotor.

In one embodiment of the present invention, there is provided an image forming apparatus, wherein the rotor driving control device according to one of the present invention is mounted, and a photoconductor drum is provided as the rotor.

According to the above structure, the rotation period fluctuation of the photoconductor drum is controlled, so that a high image quality can be achieved by reducing the displacement of the transfer image and the extension and the contraction of pixel.

In one embodiment of the present invention, a color image forming apparatus of tandem type comprises, a motor, a plurality of photoconductor drums which are rotated and driven by the motor, and are disposed corresponding to each color, a plurality of detected portions circularly disposed around a rotation axis of the photoconductor drum or a rotation axis of a gear provided in the same axis of the photoconductor drum, a device configure to generate a phase of a rotation period fluctuation corresponding to one-revolution of the photoconductor drum corresponding to each color, and a device configure to control a rotation of the motor such that the phase of the rotation period fluctuation of the photoconductor drum corresponding to each color matches, when a pixel formed on the photoconductor drum corresponding to each color is transferred on the same position on a transferred body based on the phase generated by the phase generating device.

According to the above structure, since the liner velocity of the photoconductor drum and the transfer body becomes equal in the same pixel, a color shift can be reduced.

EFFECTS OF THE INVENTION

According to one embodiment of the present invention, since passage times can be measured by four times of detected portion's passages per one-revolution of a rotor, it is possible to achieve a rotor driving control device with an inexpensive structure including a detected portion, detector, and calculating process.

In addition, a rotation period fluctuation can be detected with high accuracy in a zone having good detection sensitivity because a detection zone is freely set.

Furthermore, with respect to a plurality of rotation period fluctuations, a rotation period fluctuation can be reduced by decreasing it with a plurality of steps. Therefore, it is effective when reducing a rotation period fluctuation corresponding to not only one-revolution of rotor, but also one-revolution of a transfer mechanism such as a motor, gear or the like.

BEST MODE FOR CARRYING OUT THE INVENTION

Figure 1A:
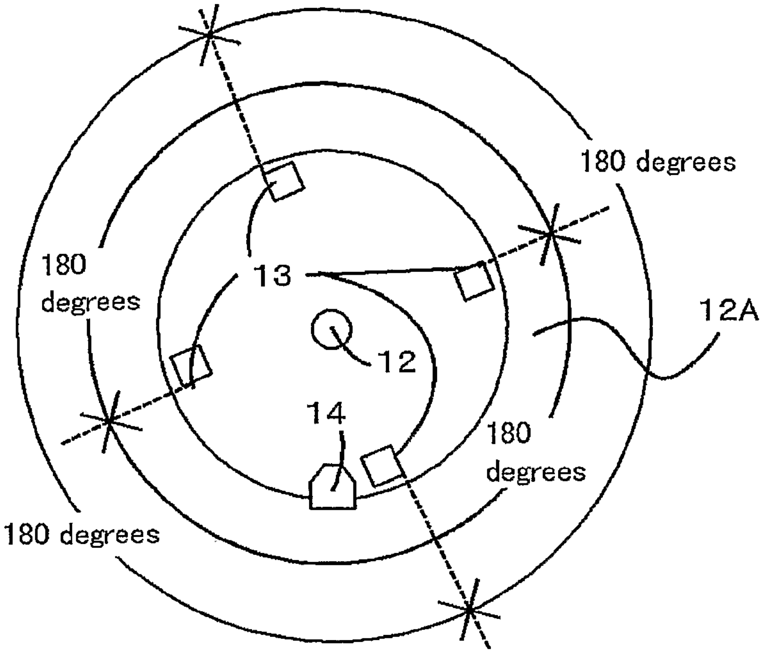
FIG. 1A is a drawing explaining that detected portions used to detect a rotation period fluctuation of the present invention is structured by slits.

Hereinafter, embodiments of the present invention will be described with reference to the drawings.

First Embodiment

Structure of DC Motor Driving System

One embodiment of the present invention will be explained by an image forming apparatus having the structure shown in FIG. 7. FIG. 7 is a structured diagram of a single driving control device in a driving control mechanism of photoconductor drum shown in FIG. 6.

A DC servomotor 6 in FIG. 7 rotates and drives a drive gear 10 through a coupling 9*a*. The drive gear 10 transmits driving force to a driven gear 11. The driven gear 11 rotates a photoconductor drum 1 through couplings 9*b*, 9*c*. A rotation shaft 12 of the photoconductor drum 1 is provided with a rotation plate 12A having a detected portion 13. The rotation plate 12A rotates with the rotation shaft 12. In this case, when the detected portion 13 passes a detecting device 14, the detecting device 14 sends a pulse signal 15 to a control device 8. The control device 8 detects the rotation period fluctuation of the photoconductor drum 1, and sends a motor speed reference signal 16 toward the motor 6 so as to decrease the rotation period fluctuation.

The photoconductor drum 1 is driven by the motor 6, the drive gear 10, and the driven gear 11 secured to the rotation shaft 12 of the photoconductor drum 1. The reduction gear ratio is, for example, 1:20. In this case, a pair of gears is used for the rotation driving mechanism to lower a cost with a small number of parts, and two gears are adopted for reducing factors of transmission errors by tooth profile errors or eccentricity. In addition, if a high reduction ratio is set by using a single reduction mechanism, the driven gear 11 provided on the rotation shaft 12 of the photoconductor drum 1 becomes a large diameter gear larger than the diameter of the photoconductor drum 1. The simple pitch error of the large diameter gear converted onto the photoconductor drum 1, therefore, is reduced, and also printing displacement and unevenness of concentration (banding) are reduced. However, the reduction ratio is determined from the angular velocity area capable of obtaining high efficiency in the target angular velocity of the photoconductor drum 1 and the characteristics of the DC motor.

Figure 8:
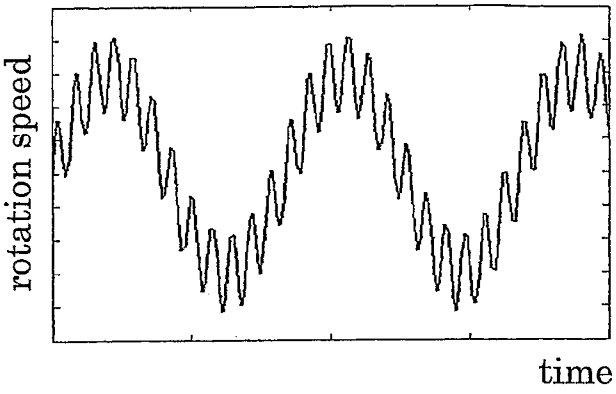
FIG. 8 is a view explaining time characteristics of a rotation period fluctuation of photoconductor drum axis.
Figure 9:
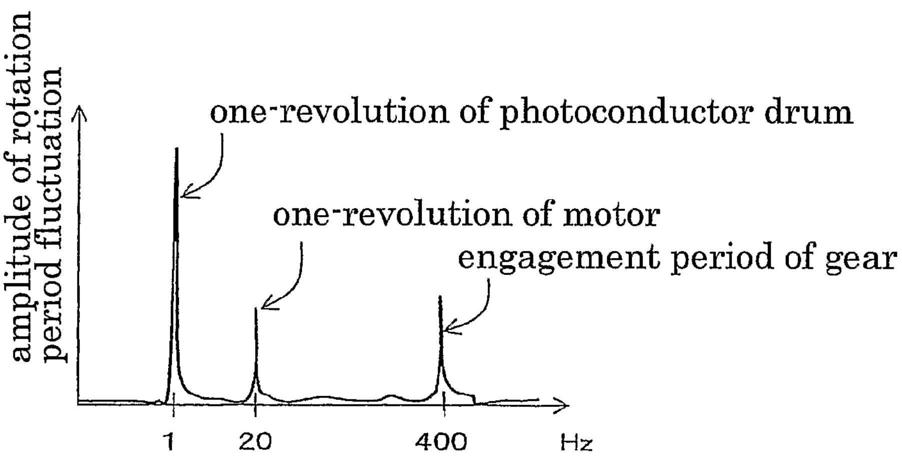
FIG. 9 is a view explaining frequency characteristics of a rotation period fluctuation of photoconductor drum axis.

FIGS. 8 and 9 explain time characteristics and frequency characteristics of the rotation period fluctuation of the photoconductor drum axis when a feedback control is carried out by using the driven gear 11 having 20 wheel teeth, reduction gear ratio of 1:20, and motor revolution speed of 1200 rpm.

As apparent from FIG. 9, the rotation shaft 12 of the photoconductor drum includes three large rotation period variations. First one is a rotation period fluctuation generating in a gear engagement period (400 Hz). This fluctuation is mainly caused by a simple pitch error of wheel tooth and backrush resulting from load change and the relationship with inertia moment. As described above, the structure of the present driving mechanism, however, the diameter of the driven gear 11 is larger than the diameter of the photoconductor drum 1, so that the fluctuation by the simple pitch of wheel tooth is small if it is converted onto the photoconductor drum 1, i.e., an image. Thus, the impact of the fluctuation by the simple pitch of wheel tooth is few.

The second fluctuation is a rotation period fluctuation generating in one-revolution of motor (20 Hz). This fluctuation is mainly caused by the cumulative pitch error of wheel tooth and the transmission error by eccentricity in the drive gear 10 of the motor axis. However, in one embodiment of the present driving mechanism, the rotation period of the drive gear 10 of the motor axis is 1/natural number of the half-revolution period of the driven gear 11. Namely, when the angle of line from the rotation center of the photoconductor drum toward an optical writing position and a transfer position is π, respectively, the fluctuation of the optical writing position and the fluctuation of the transfer position become the matched phase; thus, the influence on the displacement of the transfer image can be reduced. However, thickening of image cannot be controlled by this structure because of the speed difference between the transfer paper fed by a feeding belt and the photoconductor drum. The quality of the image is accordingly improved by controlling the rotation period fluctuation as the present invention. In addition, if the phases are matched, influence exerted by controlling errors can be reduced, and measurement errors when detecting the photoconductor drum period fluctuation can be reduced. Moreover, when the angle of the line from the rotation center of the photoconductor drum toward the optical writing position and the transfer position is not π, respectively, the angle of the line from the rotation center of the photoconductor drum toward the optical writing position and the transfer position is adopted to be an angle of which the motor axis rotates by natural number. Furthermore, in the present invention, a time passing a detection zone for detecting the rotation period fluctuation of the photoconductor drum is brought to be natural number times of the rotation period of motor axis.

The third fluctuation is a rotation period fluctuation generating in one-revolution (1 Hz) of the photoconductor drum. This fluctuation is mainly caused by the cumulative pitch error of wheel tooth and the transmission errors by the eccentricity in the driven gear 11. In addition, the axis of the driven gear 11 and the rotation shaft 12 of the photoconductor drum are connected by couplings 9*b*, 9*c*, so that the positional error of the axis center of the both axes and the deflection angles become one of the causes of the fluctuation.

Structure of Photoconductor Drum Axis Period Fluctuation Detecting Device

Figure 20:
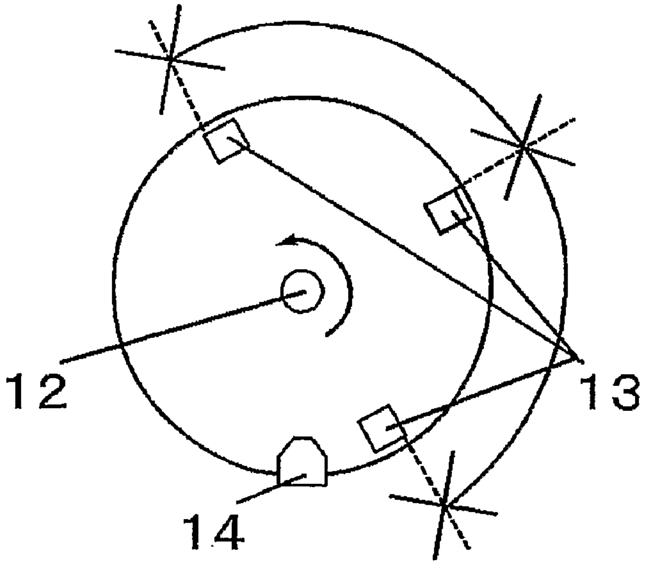
FIG. 20 is an explanation view showing a structure of a rotating plate having the minimum number of detected portions (slits).

First, a detecting device to detect the fluctuation of one-revolution period of the photoconductor drum axis 1 will be explained reference to FIGS. 1A, 1B, 2A, 2B, 4A to 4C and 20. Slits and edges shown in a slit detecting type rotating plate of FIG. 1A, 1B and edge detecting type rotating plates of FIGS. 2A, 2B and 4A to 4C correspond to the detected portions 13 shown in FIG. 7. The detected portions 13 and the detector 14 can be disposed in one of the both ends of the photoconductor drum axis direction, and can be disposed in the side of the large diameter gear (driven gear 11). When the detected portions 13 and the detector 14 are disposed in the side of the large diameter gear, however, it is necessary to reduce the positional error of center of the axis between the large diameter gear axis and the rotation axis of the photoconductor drum. FIG. 20 shows a structure having a minimum number of detected portions. The structure comprises three slits. Although three zones are structured by the slits, two zones are used as the detection zones. Thus, an extra detection zone may be used for determining a home position.

Figure 22A:
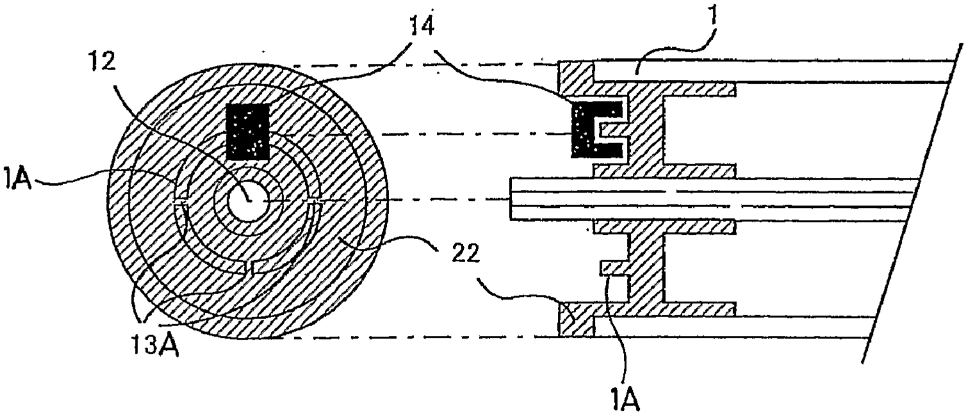
FIG. 22A is a view showing that a detected portion is provided in a flange of a photoconductor drum.
Figure 22B:
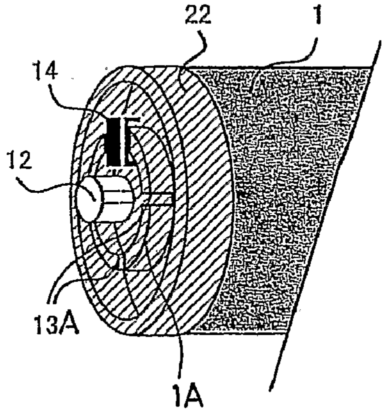
FIG. 22B is a view showing that a detected portion is provided in a flange of a photoconductor drum.
Figure 23:
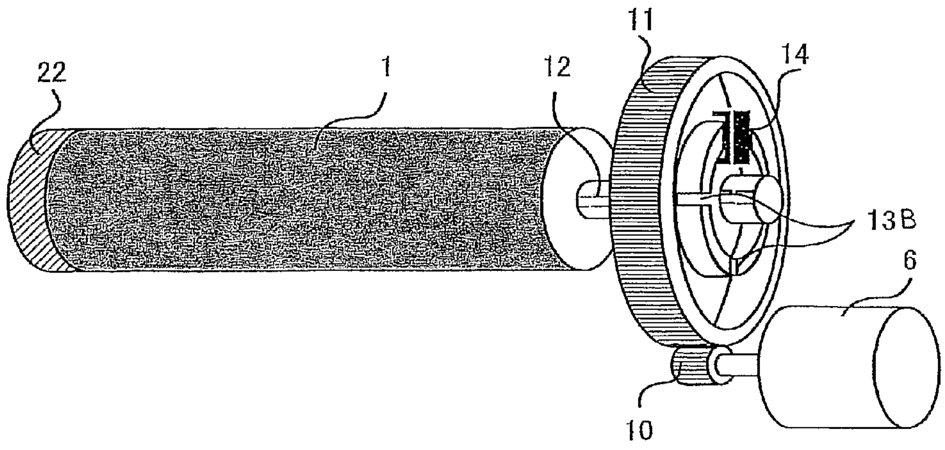
FIG. 23 is a view illustrating that detected portions are provided in a driven gear.

The rotating plate 12A is secured on the axis in order to rotate around the rotating shaft 12 of the photoconductor drum, or is disposed in the side face of the photoconductor drum 1 to integrally rotate with the photoconductor drum 1. As the structure disposed in the side face of the photoconductor drum 1, the rotating plate 12A can be disposed not only in the side face of the photoconductor drum 1, but also in the side face of the large diameter gear. For example, when the rotating plate is integrally incorporated in the photoconductor drum, notch portions 13A as detected portions are arranged in a flange A of the photoconductor drum 1, as shown in FIGS. 22A, 22B. In addition, FIG. 23 shows an example when the rotating plate is integrally incorporated in the side face of the driven gear 11. In FIG. 23, notch portions 13B as detected portions are arranged in an end face flange 11A of the driven gear 11.

Figure 18:
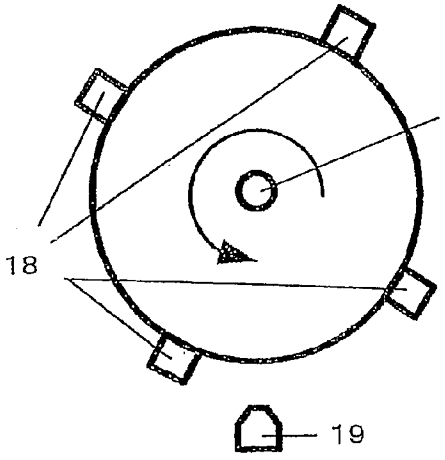
FIG. 18 is a drawing explaining that detected portions used to detect a rotation period fluctuation of the present invention is structured by magnetic materials.

The detectors 14 illustrated in FIGS. 1A, 1B, 2A and 2B detect the passage of the slits and edges, respectively. The detectors are formed by a light emitting element and light receiving element, and are configured to detect light blocking by the slits and the edges passing between the light emitting element and light receiving element. Moreover, as shown in FIG. 18, the detector can be configured to detect the passage of the detected portions with a structure that the detected portions are formed by a magnetic material 18 and the detector is formed by a magnetic sensor 19. Respective slit and edge detectors shown in FIGS. 1A, 1B, 2A, and 2B can be formed by reflection types formed with a light emitting element and a light receiving element on one of the fixing portions of the rotating plate 12A.

Figure 1B:
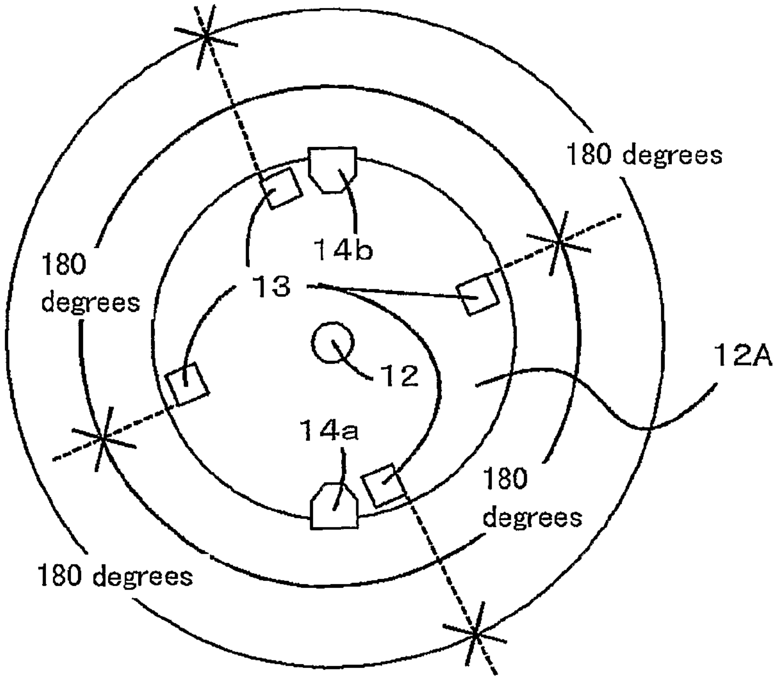
FIG. 1B is a drawing explaining that detected portions used to detect a rotation period fluctuation of the present invention is structured by slits.
Figure 2A:
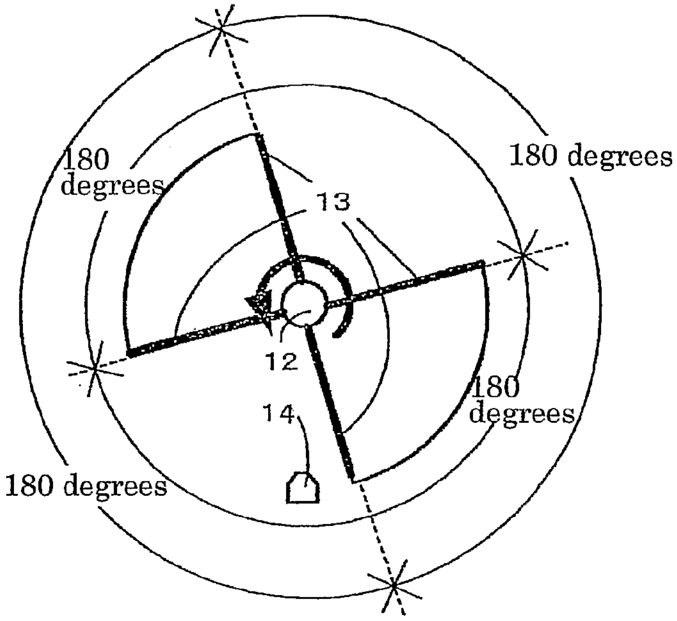
FIG. 2A is a drawing explaining that detected portions used to detect a rotation period fluctuation of the present invention is structured by edges.
Figure 2B:
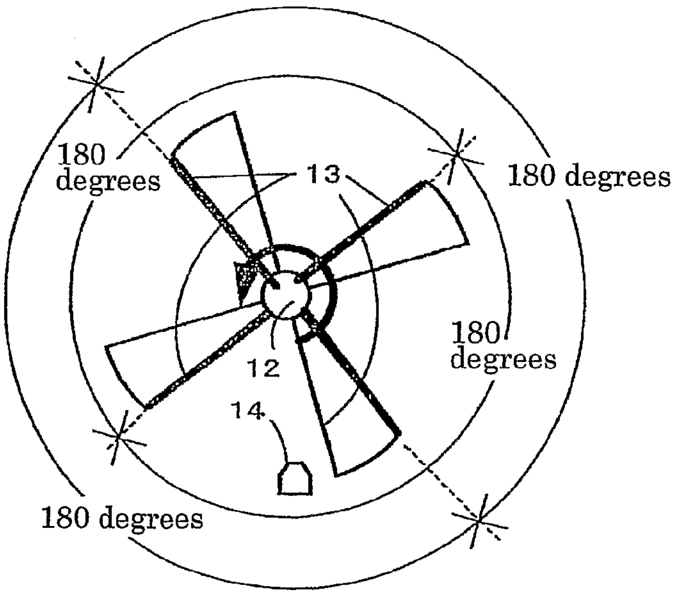
FIG. 2B is a drawing explaining that detected portions used to detect a rotation period fluctuation of the present invention is structured by edges.

Here, a structure of defected portion will be described. The detected portions of FIG. 1A, 1B are slits of the rotating plate 12A. The detected portions of FIGS. 2B, 4C are front side edges of light shielding portions, and the detected portions of FIG. 4D are back side edges of light shielding portions. Moreover, the detected portions of FIG. 2A are both of the front side edges of the light shielding portions and the back side edges of the light shielding portions. Generally, in the rising edge portion and the trailing edge portion of the output, the detector includes the error with the interval fluctuation by the installation error of the detected portion and the detector, the circuit system and the like. This error can be, therefore, avoided by unifying the measurement in the rising edge portion or the trailing edge portion. Accordingly, it is preferable to use the structure such as FIG. 1, or FIGS. 2B, 4C, 4D. As described above, various embodiments are considered, however, the present invention is not limited to only the mechanical structure but also the processing method.

Figure 10:
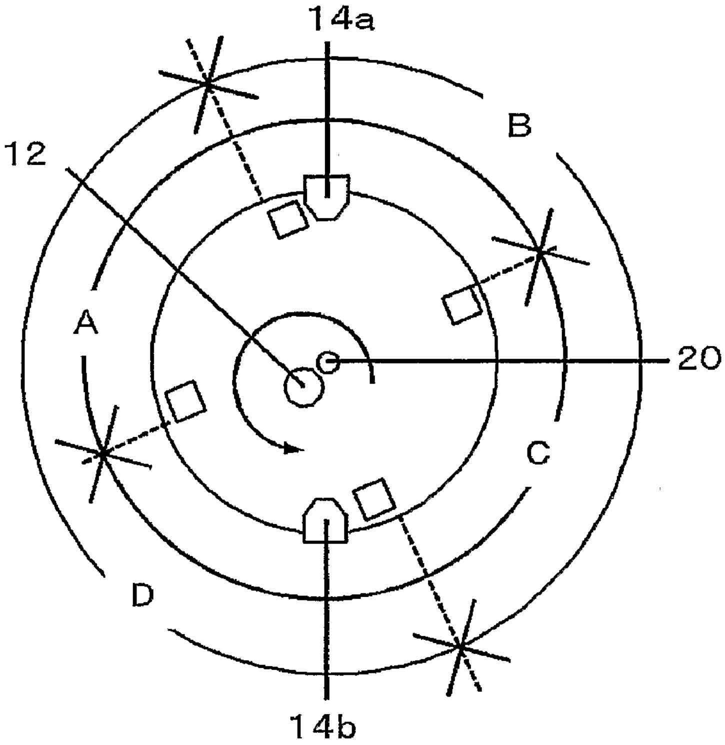
FIG. 10 is a drawing explaining a structure for correcting the installation eccentricity of the detected portion in the rotor driving control device of the present invention.

In FIG. 1B, two detectors 14*a*, 14*b* are disposed in the positions apart by 180 degrees around the photoconductor drum shaft 12. These are disposed for correcting the detection errors by the eccentricity when the axis center of the rotating plate is eccentric to the axis center of the photoconductor drum shaft 12. Details of this structure will be explained by using FIG. 10. In FIG. 10, an axis center 20 of the rotating plate 12A is eccentric to the rotating shaft 12 of the photoconductor drum, and the axis center 20 of the rotating plate 12A is mounted on the side upper than the rotating shaft 12 of the photoconductor drum. The outputs detected by the detectors 14*a*, 14*b* will be explained. In the detector 14*a*, angles of detection zones A, B constructing the upper side of the rotating shaft 12 are detected by a time shorter than the original half-revolution of the photoconductor drum shaft 12, and angles of detection zones C, D constructing the lower side are detected by a longer time. Similarly, in the detector 14*b*, the angles A, B are detected by an original time shorter than the original half-revolution of the photoconductor drum shaft 12, and the angles C, D of the lower sides are detected by a longer time. Therefore, the influence of the eccentricity can be denied by detecting the diagonal angles with separate detectors apart by 180 degrees, and by performing a process for averaging the passage time information of these zones. In this case, two detectors 14*a*, 14*b* are disposed in the positions apart by 180 degrees around the photoconductor drum shaft 12; however, the influence of the eccentricity can be eliminated by disposing these detectors apart by a given degree.

Definitions of the angles A, B, C, D of the detection zones for detecting the period fluctuations, and definitions of the phase differences between the detection zones A and B and between the detection zones C and D will be hereinafter described.

Figure 33:
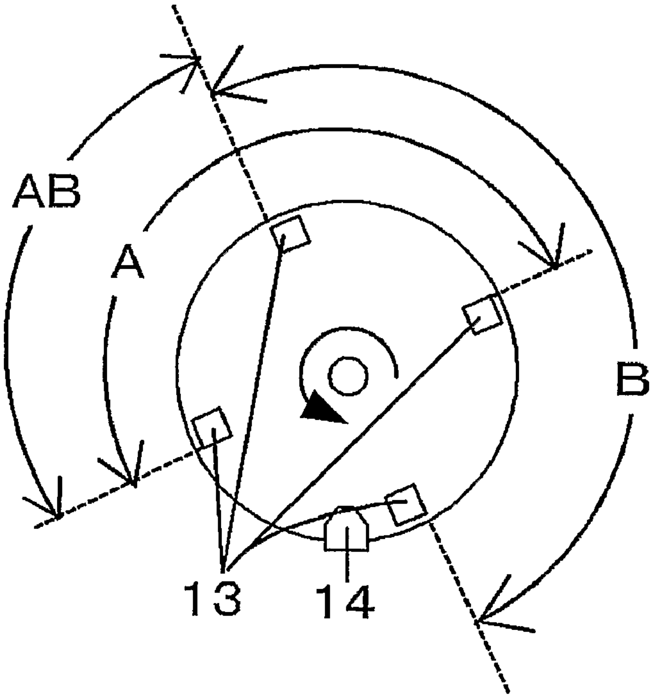
FIG. 33 is a view explaining signs corresponding to detection zones.

Next, in order to detect a rotation period fluctuation, a desirable structure of transmission mechanism from a motor to a rotor will be explained. For example, in FIG. 33, the detection zones A, B constructed by the detected portions or a detection zone AB of the phase difference between the detection zones A,B are adopted to be natural number times of the angle in which the rotor (photoconductor drum 1) rotates during one-revolution of the driven gear 10. More particularly, the phase difference of the rotation period fluctuation by the drive gear 10 in the both ends of the detection zone is adopted to be integral multiple of 360 degrees in the rotation period of the drive gear 10.

Hereinafter, it will be explained when the driving mechanism of FIG. 7 has the frequency characteristics of FIG. 9, for example. In the structure of the detection mechanism shown in FIG. 1A, 1B, 2A or 2B, the detection zone is 180 degrees, and the detection zone of the phase difference between the detection zones is 90 degrees, so that when the drive gear 10 rotates 5 times, the driven gear 11 rotates ¼. This structure can reduce the impact of the cumulative pitch error of wheel tooth over one-revolution period of the driven gear and the rotation transfer error to the photoconductor drum 1 by the eccentricity on the measurement error. The detection accuracy of the detection devices comprising the detected portion 13 and the detector 14 disposed on the same axis of the photoconductor drum 1 can be improved.

Figure 24:
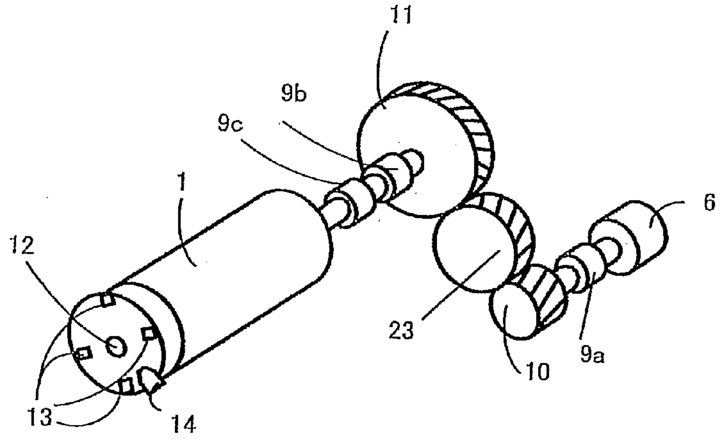
FIG. 24 is a view illustrating a driving mechanism including an intermediate gear.

Describing in detail, when the mechanism has the frequency characteristics indicated in FIG. 9, one-revolution of drum is 1 Hz. If the detection zone is 180 degrees, it is detected by the detection period of 2 Hz. Accordingly, the rotation period fluctuation (20 Hz) corresponding to one-revolution of the driven gear constantly passes the detected portions with the matched phase. In this case, the phase is argument when displaying a periodical component by trigonometric function. The phase is physically equivalence to angle (the same unit). As described above, the output of the detector becomes an output strongly affected by the rotation period fluctuation (1 Hz) corresponding to one-revolution of the photoconductor drum axis. When an intermediate gear 23 is also disposed as shown in FIG. 24, the times passing the detection zones A, B or the phase difference AB between the detection zones are designed to be the least common multiple of the rotation period of the intermediate gear 23, to be able to improve the detection accuracy.

The detection of the phase difference between the detected portions is not necessary to be natural number times of the angle in which the rotor rotates during one-revolution of the drive gear 10. As described hereinbelow, the detection errors can be reduced by conducting twice calculations. In this case, the detection errors can be reduced although the calculation time is required and a little calculation error is added.

Figure 32:
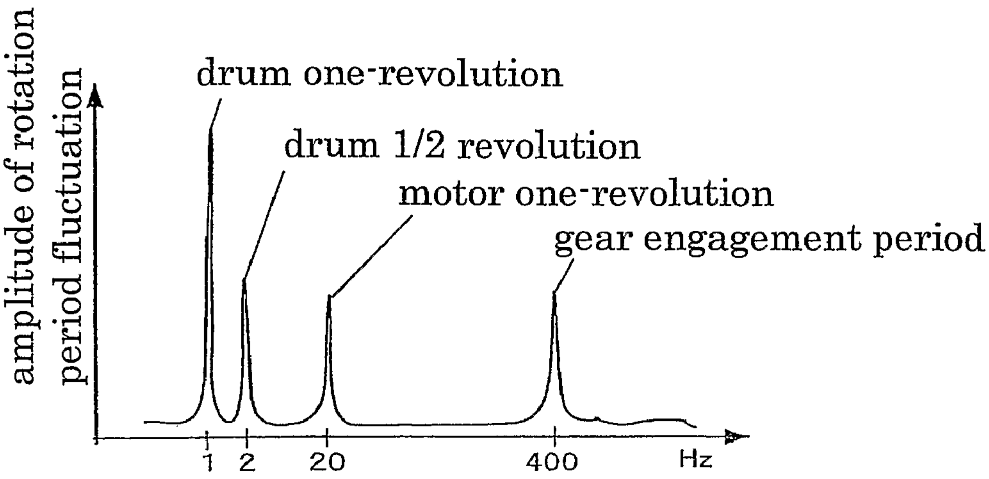
FIG. 32 is a view illustrating frequency characteristics of rotation fluctuations of a photoconductor drum axis including coupling period variations (drum ½ revolution period).

If a universal joint is used for the couplings 9*a*, 9*c*, the rotation period fluctuation corresponding to the half-revolution of the drum may generate as shown in FIG. 32. In this case, the detected portions are constructed to be 180 degrees, and the phase difference between the detected portions is constructed to be 90 degrees. The rotation fluctuation (2 Hz) corresponding to the half-revolution of the drum constantly passes the detected portion with the same phase by constructing the above.

In the example shown in FIG. 7, one-revolution period of the drive gear 10 is 1/natural number with respect to the rotation period from the exposure position of the photoconductor drum 1 to the transfer position of the transfer body. By constructing above, even though the cumulative pitch error of wheel tooth over one-revolution period of the drive gear 10 and the rotation transfer error to the photoconductor drum 1 by the eccentricity are generated, the fluctuation of the exposure position and the fluctuation of the transfer position become the matched phase. Thus, the influence on the displacement of the transfer image can be controlled.

Moreover, the time of which the detection zone constructed by the detected portions 13 passes the detector is structured to be natural number times of one-revolution period of the drive gear 10. Therefore, the detection can be carried out free from the influence of the rotation period fluctuation of the drive gear 10, while the influence on the displacement of the transfer image can be controlled.

Figure 21A:
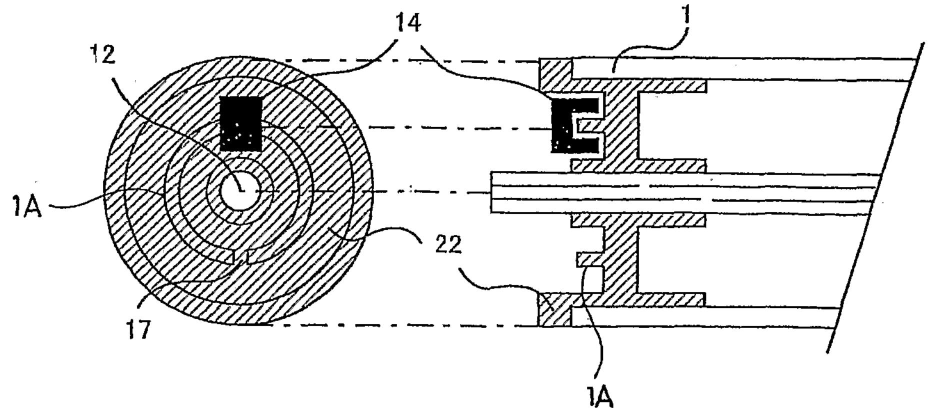
FIG. 21A is a view showing that a home position is attached to a flange of a photoconductor drum.
Figure 21B:
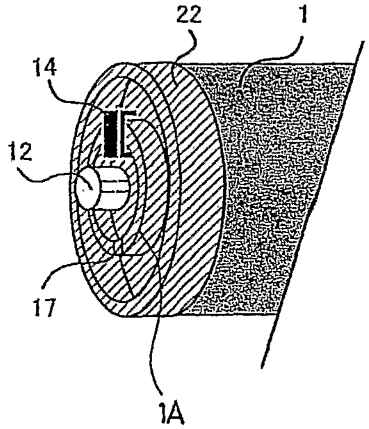
FIG. 21B is a view showing that a home position is attached to a flange of a photoconductor drum.

Finally, a structure of home position detection for detecting and correcting a rotation period fluctuation will be described. The most common structure for detecting a home position is to dispose another detector and another detected portion. These are not always disposed in a rotating plate for detecting a rotation period fluctuation, and can be arranged in a flange 1A of the concentric circle of the photoconductor drum axis as shown in FIG. 21, for example. However, this structure is disadvantageous in that the detection mechanism is complicated, and requires a cost for newly installing a detector. The present invention can be achieved by the above structures. However, the present invention was accomplished by a structure easier than the above structure. Hereinafter, the embodiment will be described.

Figure 11:
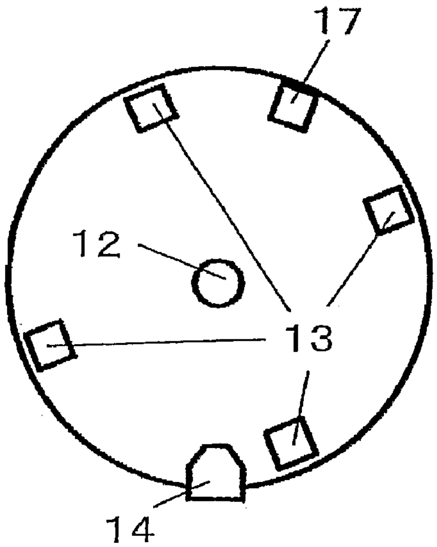
FIG. 11 is a view explaining a structure that a reference detected portion is provided in a rotor driving control device of the present invention as a home position.
Figure 16:
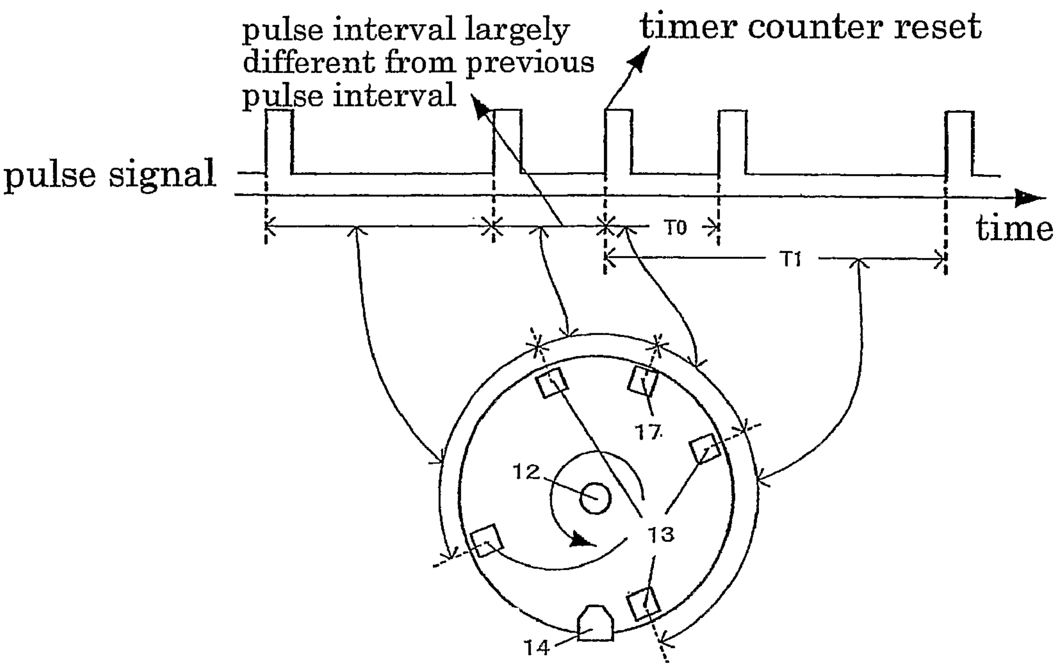
FIG. 16 is a view explaining a pulse signal and a timer counting process when providing a special detected portion s a home position.
Figure 17:
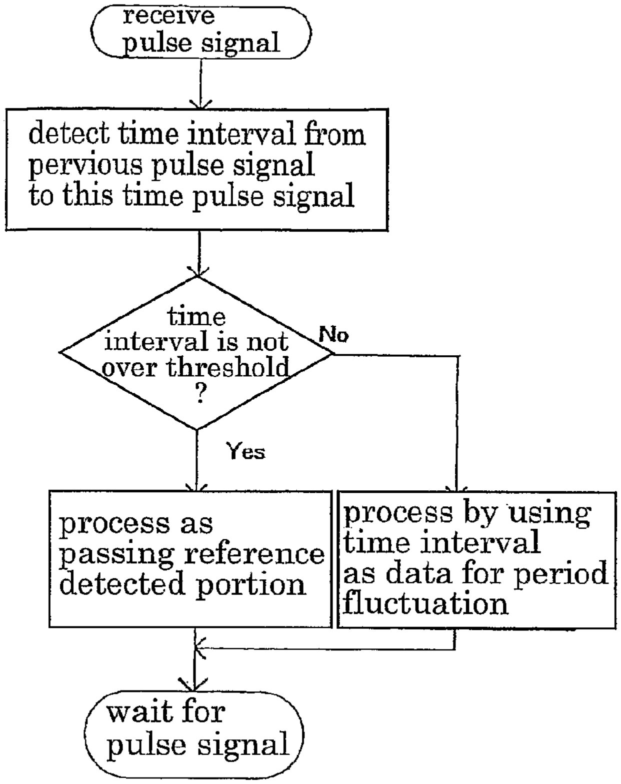
FIG. 17 is a flow chart showing a process whether passing the detected portions or not.

At first, a structure for providing an extra detected portion to detect a home position will be described. In this case, a reference detected portion 17 is newly disposed on the circumference of the detected portions 13 circularly arranged around the rotating shaft 12 of the photoconductor drum as illustrated in FIG. 11. In this case, pulse signals detected by the detector 14 are represented in FIG. 16. The distance between the detected portions is structured by 90 degrees as shown in FIGS. 1A, 1B, 2A, 2B. More particularly, the plus signals when the detector 14 detects the detected portions 13 become substantially a fixed interval. The plus signal when the detector 14 detects the reference detected portion 17 is apparently decreased compared with the time interval of the previous pulse. When the time interval of small plus is detected compared with the time interval of previous pulse, therefore, it can be determined that the home position is passed. The passage of the reference detected portion 17 can be processed by providing the threshold as the flow chart shown in FIG. 17. In this case, the threshold is compared with the time interval of the pulse signal. However, the time fluctuation by the rotation period fluctuation is μ sec order, while the time fluctuation by the passage of the reference detected portion is m sec order. The reference detected portion 17 and the detected portion 13 can be, therefore, discriminated by providing the threshold of m sec order. It is possible to determine whether the coming pulse is a home position or not by using the change in the pulse interval when passing the reference detected portion, so that the detection or the control can be carried out by using this pulse as a reference.

Figure 19:
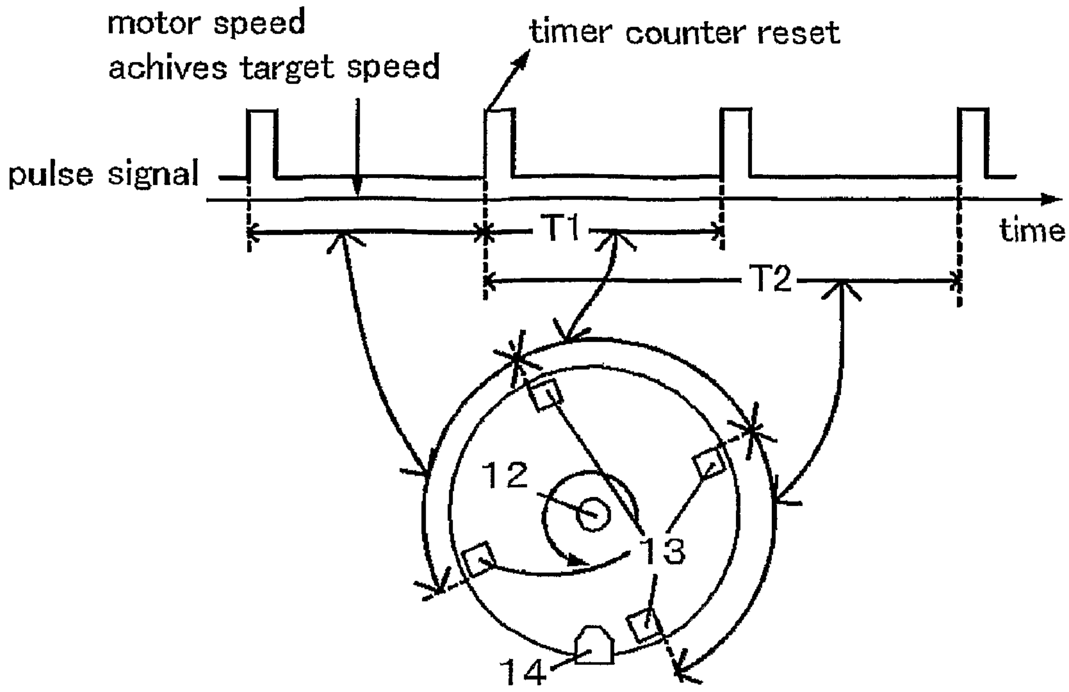
FIG. 19 is a view explaining a pulse signal and a timer counting process when a special detected portion is not provided as a home position.

Next, a structure without having an extra detected portion to detect a home position will be explained. Here, an explanation is given by using the detection mechanism of FIG. 1A. In this case, when the rotation of the motor becomes a constant speed, any one of the detected portions in FIG. 1A is used as a home position, and the home position is observed by a circuit or a firm ware. A method for setting a home position sets a detected portion corresponding to a pulse signal detected just after the motor rotation speed has achieved the target speed as a home position. FIG. 19 shows this setting method. A home position is set by resetting a timer counter at the same time that the pulse signal just after the motor has achieved the target speed is detected. The number of detected portions provided in one-revolution is previously recorded to continuously count the number of pulses at the passage times of the detected portions 13, so that the home position is constantly detected. In this method, a home position is determined and correction data corresponding to the home position are prepared every time turning on a power source. In this case, the home position is reorganized by the circuit or the firm ware. This method for detecting a home position is adopted for following embodiments.

Hereinafter operations of the photoconductor drum driving control mechanism shown in FIG. 7 will be described with reference to FIGS. 12A, 12B.

Figure 12A:
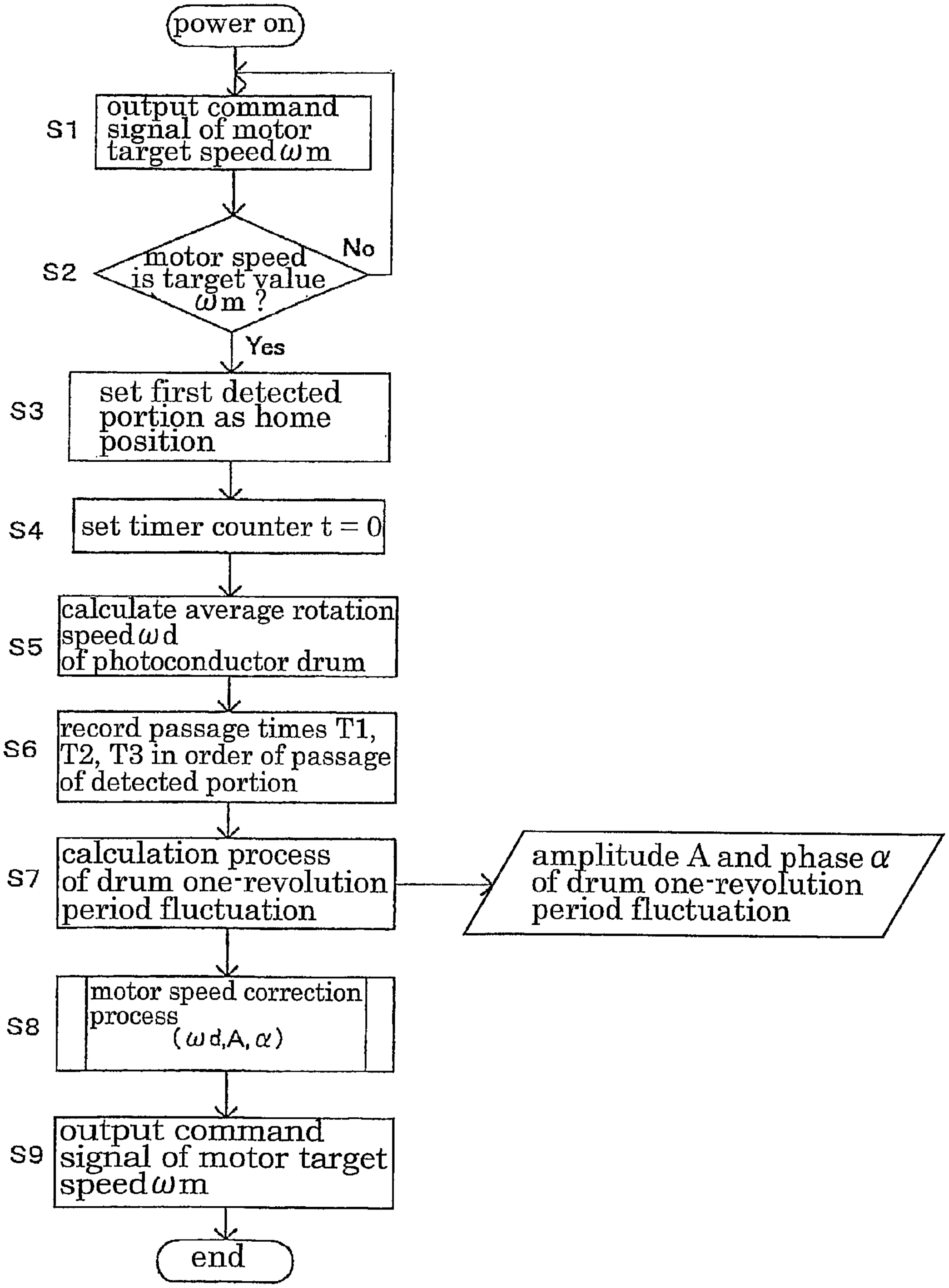
FIG. 12A is a flow chart showing detection and a control operation in the control device shown in FIG. 7.
Figure 12B:
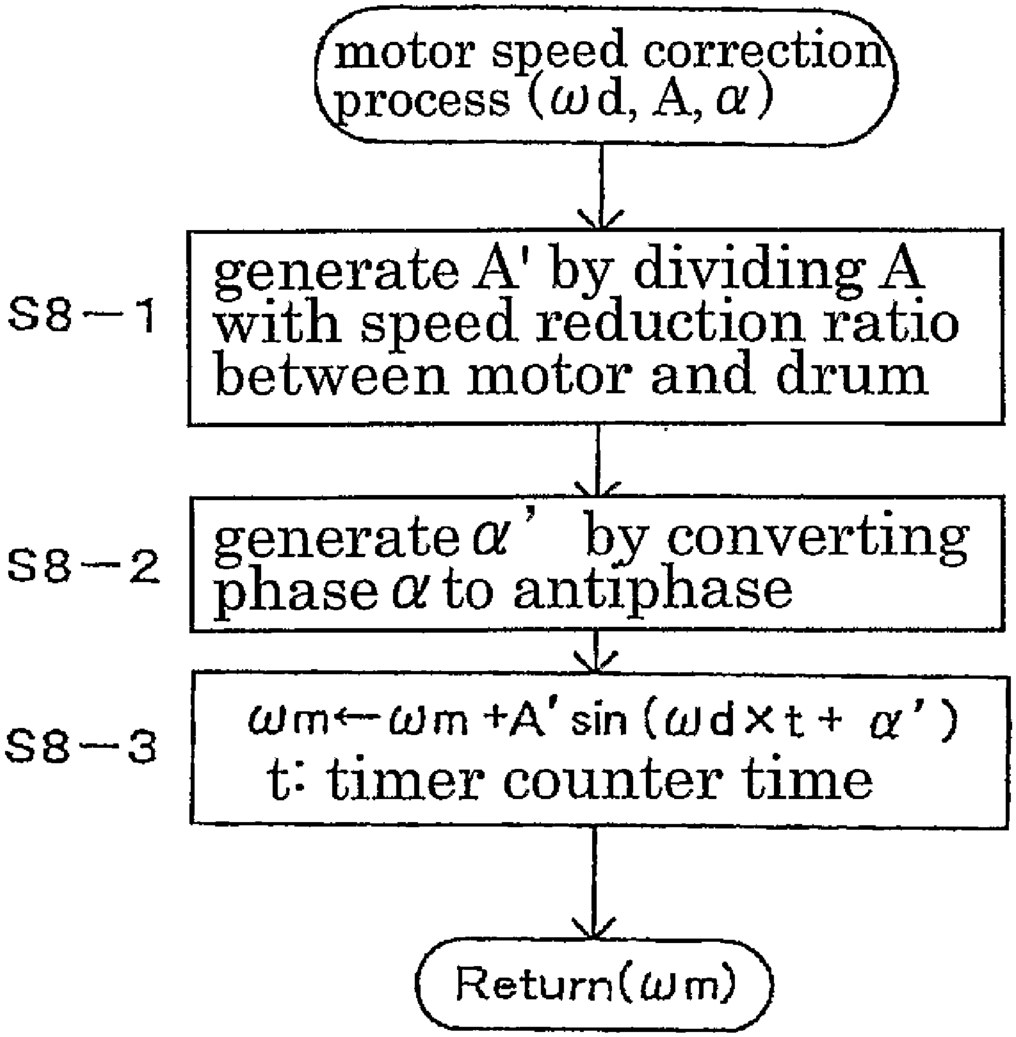
FIG. 12B is a flow chart showing detection and a control operation in the control device shown in FIG. 7.

FIGS. 12A, 12B show a control for reducing a rotation period fluctuation of the photoconductor drum 1 in the image forming apparatus illustrating the present embodiment, and are flow charts illustrating an example of processing from data processing to correcting control for correcting and controlling a motor angular velocity. This control is processed based on a control program stored in the control device 8 shown in FIG. 7. In addition, the structure of FIG. 1A is used as the detection mechanism.

Before the correcting control for reducing the rotation period fluctuation corresponding to one-revolution of the photoconductor drum axis, the rotation period fluctuation corresponding to one-revolution of the photoconductor drum axis is detected as information for the correction. When the home position can be set in the fixed position as shown in FIG. 16, this pre-operation can be performed in a manufacturing process before shipping a product, or at the time of exchanging the photoconductor drum. Accordingly, the operation for correcting a photoconductor drum period fluctuation can be immediately carried out without detecting one-revolution period fluctuation of the photoconductor drum. However, in this embodiment, an explanation is given when the home position is not fixed. In this case, the photoconductor drum period fluctuation has to be constantly detected after turning on the power source. For example, when fastening portion is slipped with time or environment, however, the photoconductor drum period fluctuation can be detected with respect to each predetermined time, a predetermined number of papers in accordance with a user's status of use (timing without including a printing requirement), or during forming an image.

The control device 8 outputs a command signal to drive the DC servomotor 6 by a target angular velocity ωm (step S1) to rotate the DC servomotor 6. The control device 8 determines whether the target angular velocity is achieved or not based on the angular velocity information output from an angular velocity detector (not shown) of the DC servomotor 6 (step S2). When the target angular velocity is not achieved, the operation goes back to the step S1; when the control device 8 determines that the target angular velocity is achieved, the control device 8 sets one of the detected portions as a home position with an appropriate timing (step S3). At this time, a counter of an internal timer unit provided in the control device 8 is set to 0 (step S4) to measure time.

The detector 14 outputs the pulse signals 15 when the detected portion 13 installed in the photoconductor drum axis is passed, and sends the pulse signals 15 to the control device 8. The control device 8 stores the time measured by the counter of the internal timer unit when the pulse signals 15 have received in a data memory. The number of detected portions is kept as data in advance. One-revolution of the photoconductor drum is determined by the output pulses of the total number of detected portions. The average angular velocity ωd of one-revolution of the photoconductor drum is calculated by measuring the time required for one-revolution (step S5). The process for measuring the time required for one-revolution can reduce the detection errors of rotation period fluctuation when stationary errors are generated in the speed control of the motor.

Figure 28:
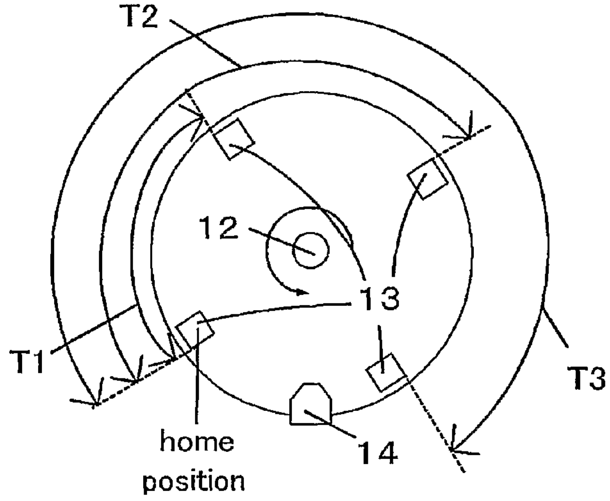
FIG. 28 is view explaining a relationship between detection times and detection mechanism when a reference detected portion is not specially disposed.
Figure 34:
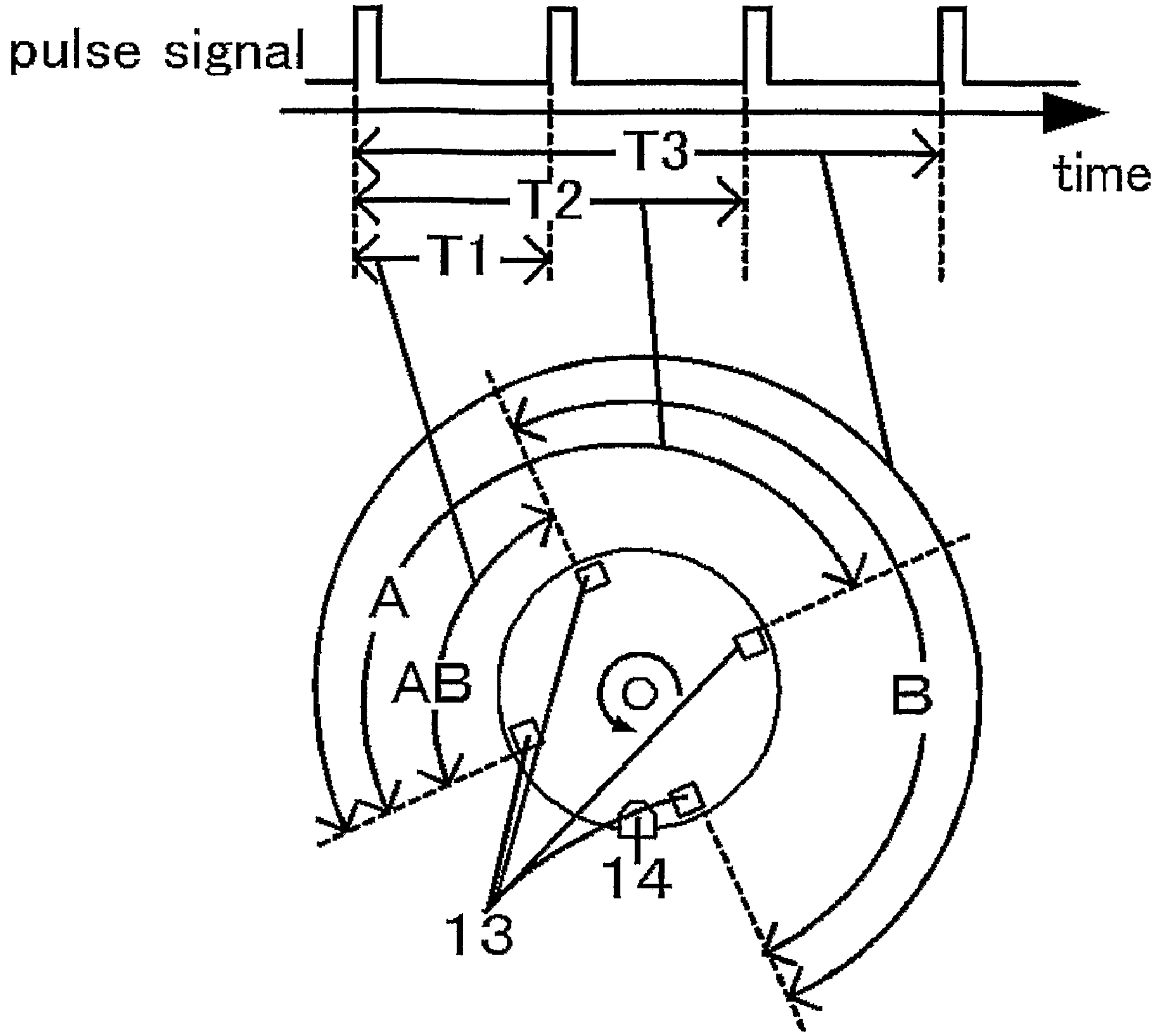
FIG. 34 is a view describing a relationship between detection mechanism, detection times, and detection zones.

As shown in FIG. 28, the control device 8 stores the passage times T1, T2, T3 in the memory for data built in the control device 8, in order of passing the detected portion when the home position has been redetected (step S6). A process for calculating a rotation period fluctuation corresponding to one-revolution of the drum is performed by using the passage times T1, T2, T3 (step S7). In this case, the relationships between the data of passage times T1, T2, T3, the detection zones A, B and the phase difference AB of the detection portions are shown in FIG. 34.

The process for calculating a rotation period fluctuation corresponding to one-revolution of a drum (step S7) has a function for calculating the amplitude and the phase of the rotation period fluctuation corresponding to one-revolution of the photoconductor drum axis. The rotation period fluctuations are generated in the photoconductor drum axis as shown in FIG. 8. In these fluctuation components, an amplitude of rotation period fluctuation corresponding to one-revolution of the photoconductor drum axis is adopted to be A, an initial phase using a home position as a reference is adopted to be α, and an average angular velocity ωd is adopted to be ω to calculate. The calculation process is conducted by solving the following equation by using a first zone constructed by two portions of the detected portions (angle A of detection zone in FIG. 34) as a time T2 from the home position (time 0), a second zone constructed by two portions of the detected portions (angle B of detection zone in FIG. 34) as a time T3 from a time T1, and a phase difference between the first zone and the second zone (angle AB of detection zone in FIG. 34) as the time T1 from the time 0.

$$\begin{bmatrix} \sin\left(\frac{\omega T2}{2}\right) & \cos\left(\frac{\omega T2}{2}\right) \\ \sin\left(\frac{\omega(T3+T1)}{2}\right) & \cos\left(\frac{\omega(T3+T1)}{2}\right) \end{bmatrix} \begin{bmatrix} A\cos\alpha \\ A\sin\alpha \end{bmatrix} = \omega \begin{bmatrix} (\pi-\omega T2)/2\sin\left(\frac{\omega T2}{2}\right) \\ (\pi-\omega(T3-T1))/2\sin\left(\frac{\omega(T3-T1)}{2}\right) \end{bmatrix} \quad \text{equation (1)}$$

The above equation (1) can be solved by obtaining the inverse matrix of the matrix of the left-hand side, or by using another numerical calculation method.

Therefore, the amplitude A of the fluctuation component of one-revolution period of the photoconductor drum axis and the phase α using the home position as the reference are obtained. A motor speed correcting process is conducted (step S8) after the calculation process of this A and α has finished. At first, the amplitude A' and is converted to the period fluctuation amplitude of the motor axis rotation speed in consideration of the reduction ratio of the motor and the drum (step S8-1). Next, π is added to the phase a to be converted to the antiphase (step S8-2). A sin signal is generated by the amplitude A' and the phase α' calculated in the steps S8-1, S8-2, the sin signal is combined with the present target angular velocity of motor ωm to generate the corrected target angular velocity of motor ωm' (step S8-3). The corrected angular velocity of motor ωm' is represented as shown in formula (2) with respect to the time t using the home position as the reference.

$$\omega m' = \omega m + A' \sin(\omega d \times t + \alpha') \quad \text{equation (2)}$$

The corrected angular velocity of motor ωm' is stored in the target angular velocity of motor ωm in the memory of control device 8.

The target angular velocity of motor ωm is given as a command signal, synchronizing with the home position (step S9), and the rotation period fluctuation corresponding to one-revolution of the photoconductor drum is controlled.

Although the detection sensitivity is lowered from the time 0 to the time T1, the phase difference between the first zone and the second zone is detectable not necessarily to be π/2.

Moreover, in the structure having the minimum number of detected portions shown in FIG. 20, when the passage time is detected as FIG. 37, the rotation period fluctuation corresponding to one-revolution of the photoconductor drum is as follows.

$$\begin{bmatrix} \sin\left(\frac{\omega T1}{2}\right) & \cos\left(\frac{\omega T1}{2}\right) \\ \sin\left(\frac{\omega(T2+T1)}{2}\right) & \cos\left(\frac{\omega(T2+T1)}{2}\right) \end{bmatrix} \begin{bmatrix} A\cos\alpha \\ A\sin\alpha \end{bmatrix} = \omega \begin{bmatrix} \left(\frac{\pi}{2} - \omega T1\right) / 2\sin\left(\frac{\omega T1}{2}\right) \\ \left(\frac{\pi}{2} - \omega(T2 - T1)\right) / 2\sin\left(\frac{\omega(T2 - T1)}{2}\right) \end{bmatrix} \quad \text{equation (3)}$$

Figure 37:
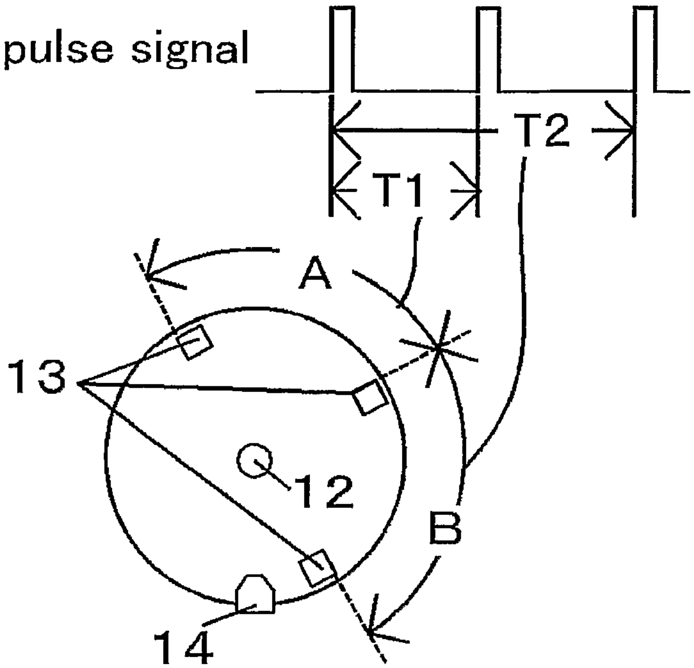
FIG. 37 is a view describing a relationship between detection zones and passage times in the detection by the minimum number of detected portions.

In FIG. 37, if the angle A of the first zone and the angle B of the second zone are used to be angles rotating natural number times of the rotation number of motor, the accuracy of the time measurements are improved in these zones, the rotation period fluctuation detection corresponding to one-revolution of the photoconductor drum becomes high accuracy.

Second Embodiment

In this embodiment, a method for matching a phase of rotation period fluctuation corresponding to one-revolution of a photoconductor drum of each color will be explained, in order to reduce a color shift generated by the rotation period fluctuation corresponding to one-revolution of the photoconductor drum of each color. This method independently rotates and drives the driving motor such that a plurality of photoconductor drums rotates by a predetermined phase difference with respect to the reference phase of the rotation period fluctuation of the photoconductor drum, adjusts the rotation period fluctuation phase corresponding to one-revolution of the photoconductor drum in the same pixel on the photoconductor drum of each color, superimposes the same pixel on a transfer paper such that the rotation period fluctuation phases match, and reduces the color shift of sub-scanning direction. The image quality can be, therefore, prevented from deteriorating. The phases are matched by adjusting the motor rotation speed faster than the target sped or slower than the target speed in a certain time.

Figure 13:
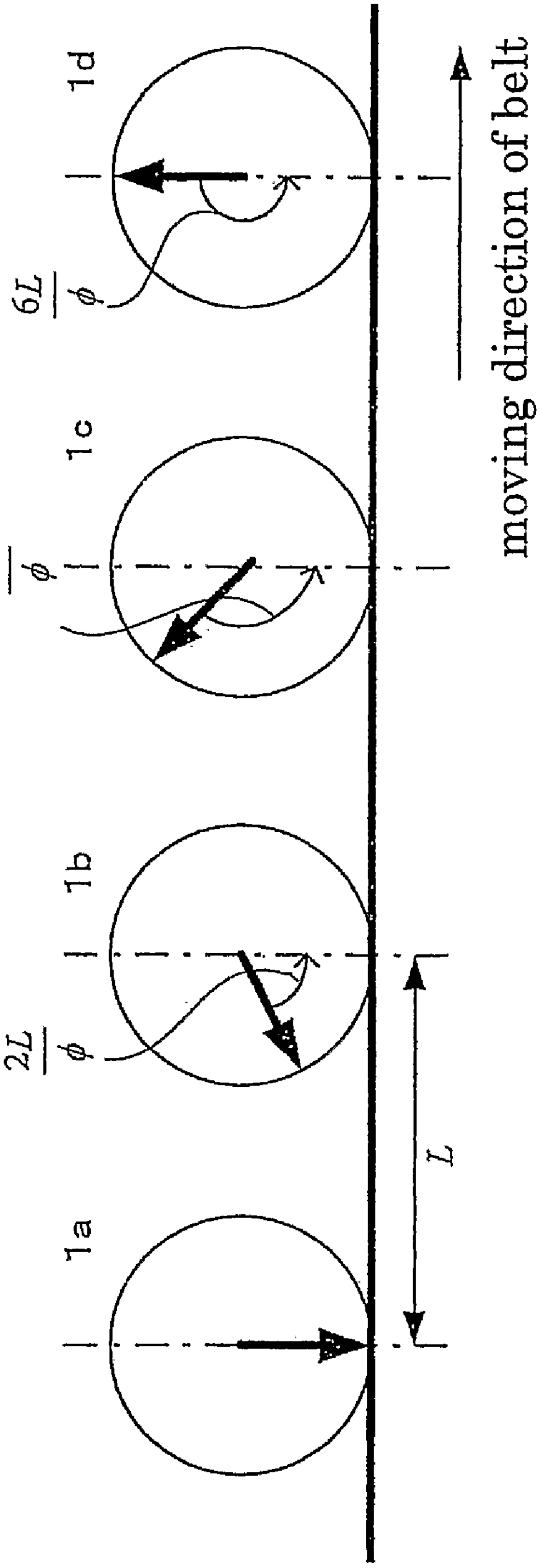
FIG. 13 is a view explaining phase matching between four photoconductor drums of tandem type of a second embodiment of the present invention.

It will be described that the structure of the image forming apparatus shown in FIGS. 6, 7 as well as the first embodiment has the detection mechanism of FIG. 1A. As illustrated in FIG. 13, reference numerals 1*a*, 1*b*, 1*c*, and 1*d* denote four photoconductor drums, the phases of rotation period fluctuations corresponding to one-revolution of the three photoconductor drums are matched to the reference of the photoconductor drum driving system of the most end portion 1*a*. In this case, it is considered that the belt speed and the average peripheral velocity f of the photoconductor drum are equally driven. Arrow positions indicated on the respective photoconductor drums of FIG. 13 are set as a reference position for matching the phase. The reference positions for matching phases (arrow positions) represent the positions that the rotation period fluctuation corresponding to one-revolution of the photoconductor drum of each photoconductor drum becomes the matched phase. When transferring in the arrow positions shown in the respective photoconductor drums, therefore, the transfer is performed with a state that the rotation period fluctuations of the respective photoconductor drums are the matched phase. Accordingly, when the images to be formed onto the four photoconductor drums are transferred onto the belt or the transfer paper, the respective rotation period fluctuations are superimposed with the matched phase. In order to match phases of the rotation period fluctuations at the time of transferring, it is necessary to provide a phase difference worth of the distance between the photoconductor drums. Specifically, when the photoconductor drum 1*a* is transferred by the arrow, the distance between the photoconductor drums is adopted to be L, and the diameter of the photoconductor drum is adopted to be ϕ to be L>πϕ, and the arrow or the photoconductor drum 1*b* to be transferred next is rotated by delaying the phase with the rotation angle L/πϕ×2π=2L/ϕ [rad].

Similarly, in order to match the respective arrow positions of the photoconductor drums 1*c*, 1*d* to the arrow position of the photoconductor drum 1*a*, the photoconductor drum 1*c* and 1*d* are rotated by delaying the phase with the rotation angles of 4L/ϕ, 6L/ϕ[rad], respectively.

In L<πϕ, the photoconductor drums 1*b* to 1*d* are rotated by advancing the rotation period fluctuation phase with respect to the photoconductor drum 1*a*.

When the photoconductor drums 1*a* to 1*d* are driven by providing the above rotation phase differences, the pixel existed on the point of the arrow of the photoconductor drum 1*b* is superimposed onto the pixel transferred at the point of the arrow of the photoconductor drum 1*a*. Similarly, in the photoconductor drums 1*c*, 1*d*, the pixel when the arrow has reached to the transfer position is superimposed.

Figure 14:
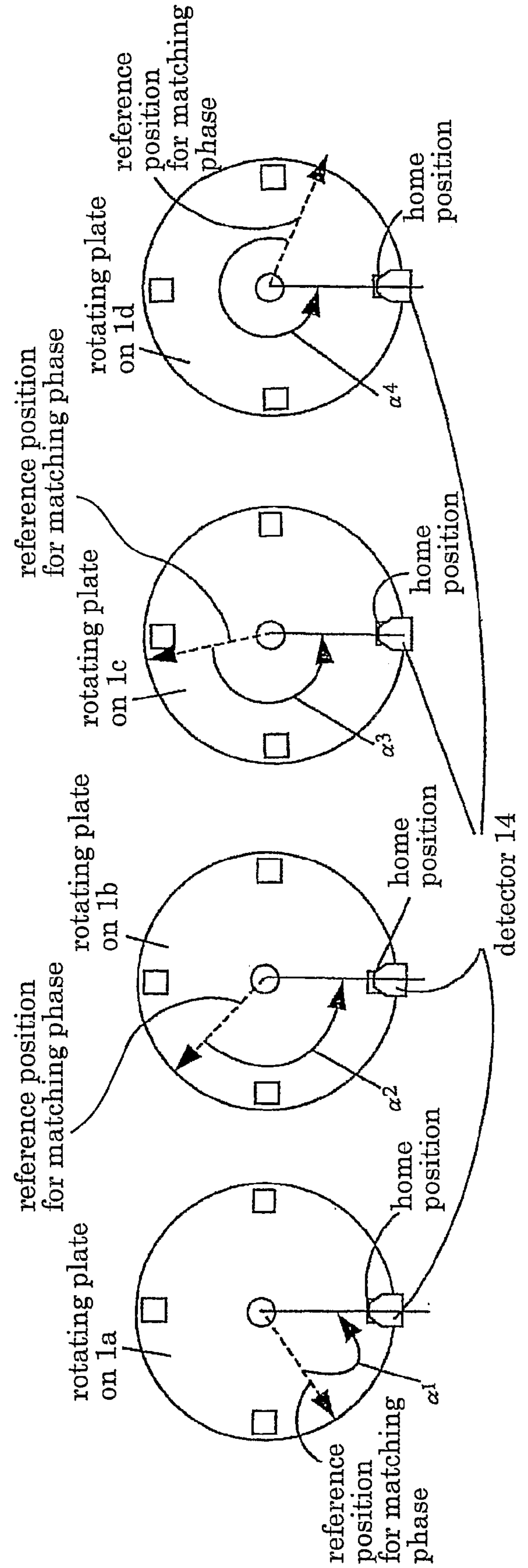
FIG. 14 is a view explaining a relationship between a home position and a phase matching reference position in the second embodiment.
Figure 15:
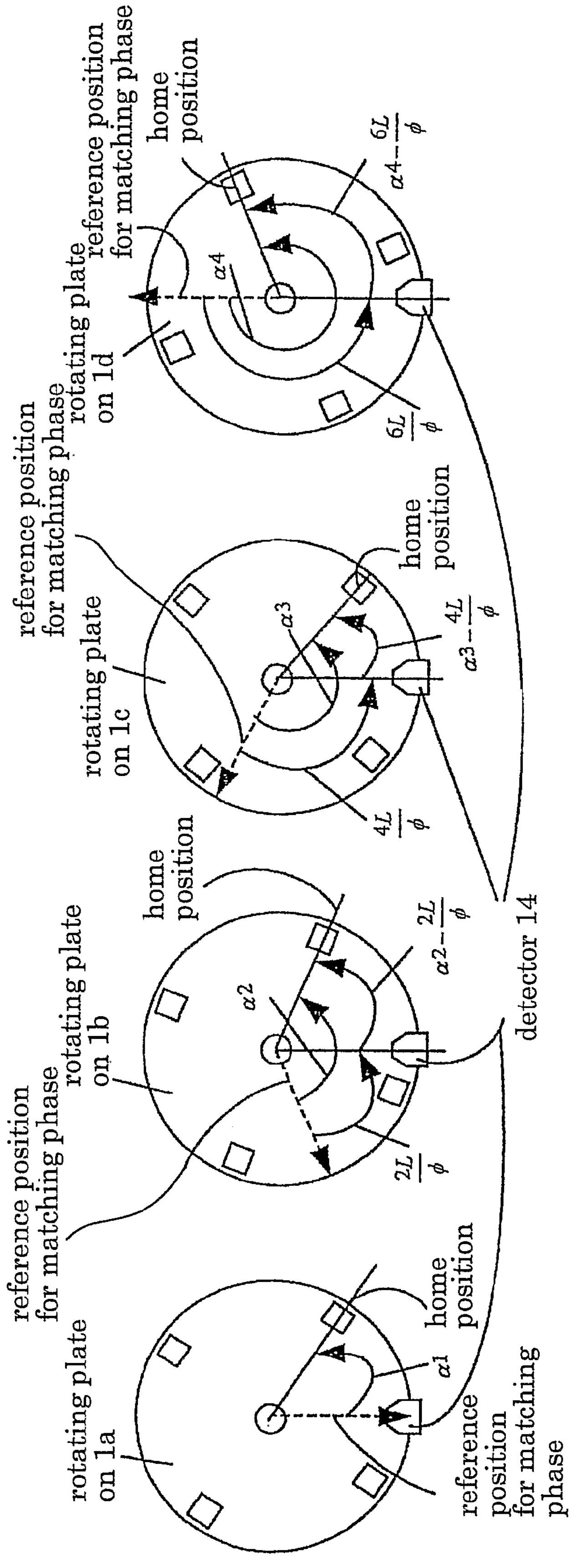
FIG. 15 is a view explaining a phase relationship between the photoconductor drums after the phases have been matched from the state shown in FIG. 14.
Figure 30A:
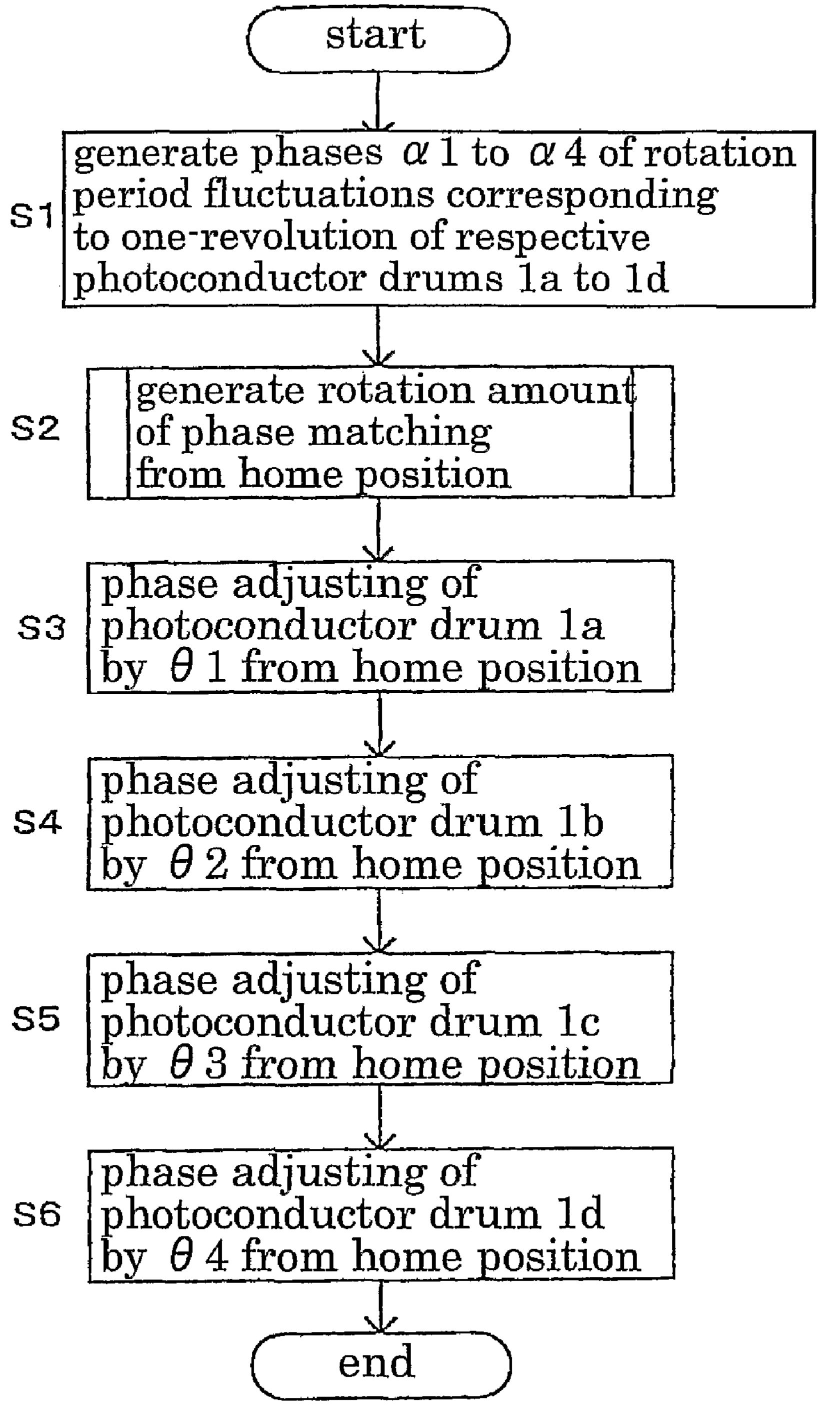
FIG. 30A illustrates a flow chart of a phase matching of rotation period variation.
Figure 30B:
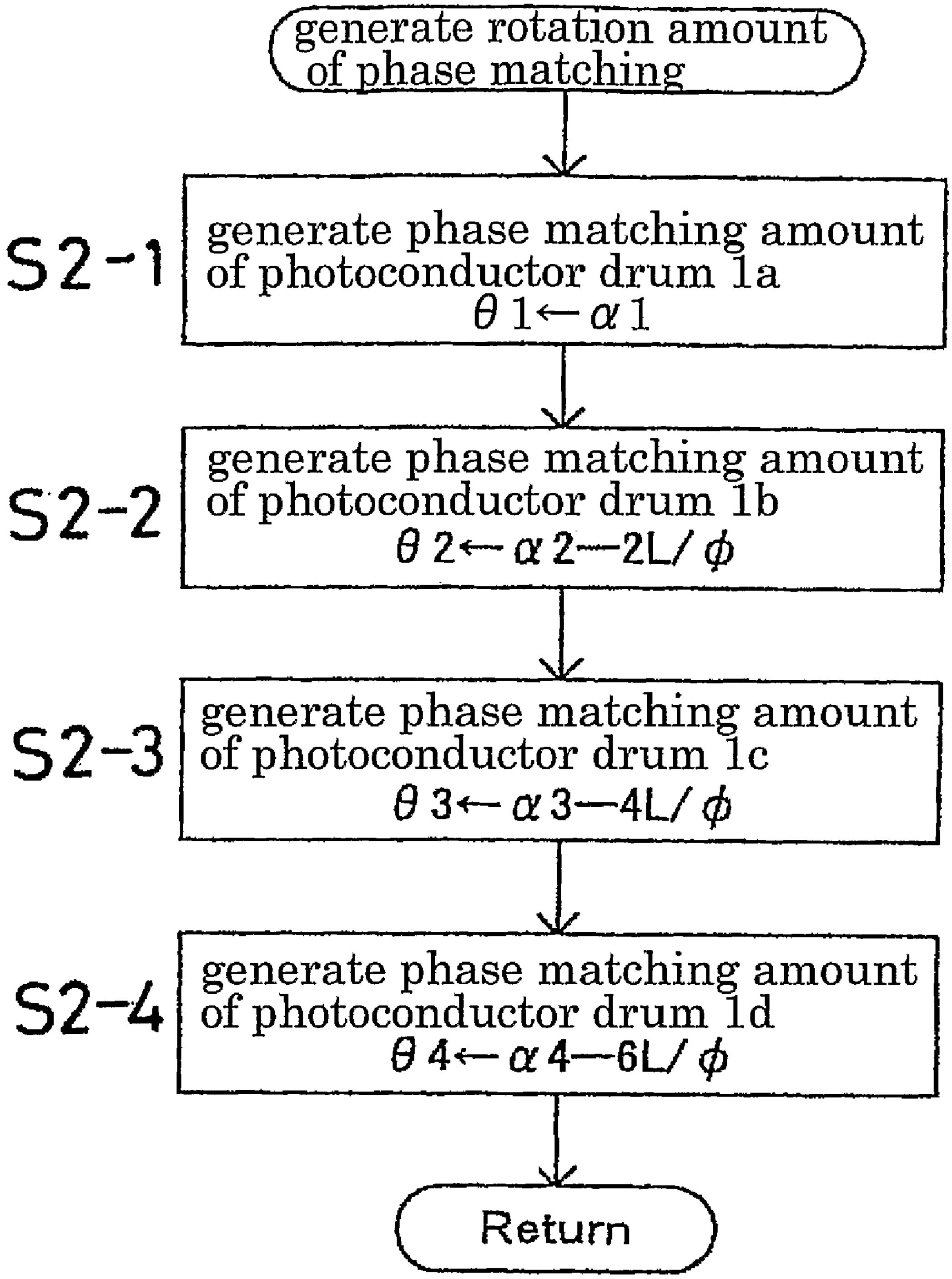
FIG. 30B illustrates a flow chart of a phase matching of rotation period fluctuation.

A method for adjusting a reference position for matching phases by providing the detected portions in each ¼-rotation of the drum as shown in FIG. 1A will be explained by using FIGS. 14, 15, and the flowchart of FIG. 30 as L>πϕ. At first, the amplitude and phase of the rotation period fluctuation corresponding to one-revolution of drum are calculated in the respective photoconductor drums 1*a* to 1*d* (step S1 in FIG. 30A). This calculation method is achieved by using the method explained in the first embodiment. Next, as shown in FIG. 14, the phase difference (angle) from the home position to the reference position for phase matching disposed on the respective rotating plates on the respective photoconductor drums are adopted to be α1 to α4 (step S2 in FIG. 30A), respectively. When the phase matching reference position in the photoconductor drum 1*a* reaches to the transfer position (just below), the phase matching reference positions in the photoconductor drums 1*b*, 1*c*, 1*d* are as illustrated in FIG. 15. Therefore, the rotation of each photoconductor drum is adjusted by the following rotation phase (angle) (steps S3 to S6 in FIG. 30A). In addition, the steps S2-1 to S2-4 in FIG. 30B are the subroutine of the step S2, and the following equation (4) is conducted.

$$\left.\begin{aligned} 1a&:\theta 1 = \alpha 1(\text{rad}) \\ 1b&:\theta 2 = \alpha 2 - \frac{2L}{\phi}(\text{rad}) \\ 1c&:P\theta 3 = \alpha 3 - \frac{4L}{\phi}(\text{rad}) \\ 1d&:\theta 4 = \alpha 4 - \frac{6L}{\phi}(\text{rad}) \end{aligned}\right\} \quad \text{equation (4)}$$

The method for matching phases of a rotation period fluctuation corresponding to one-revolution of a photoconductor drum of each color was only described in the second embodiment. In addition, the correction of the rotation period fluctuation described in the first embodiment can be performed. In this case, after the phases of respective photoconductor drums have been matched by the phase matching of the second embodiment, the rotation period fluctuations of the respective photoconductor drums are corrected and controlled based on the first embodiment. The respective photoconductor drum rotation phases are adjusted as follows.

Figure 6:
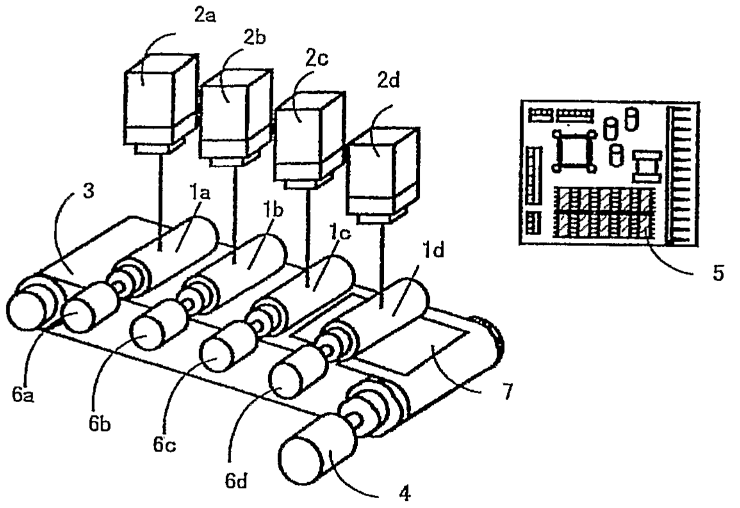
FIG. 6 is a drawing illustrating an example of image forming apparatus.
Figure 7:
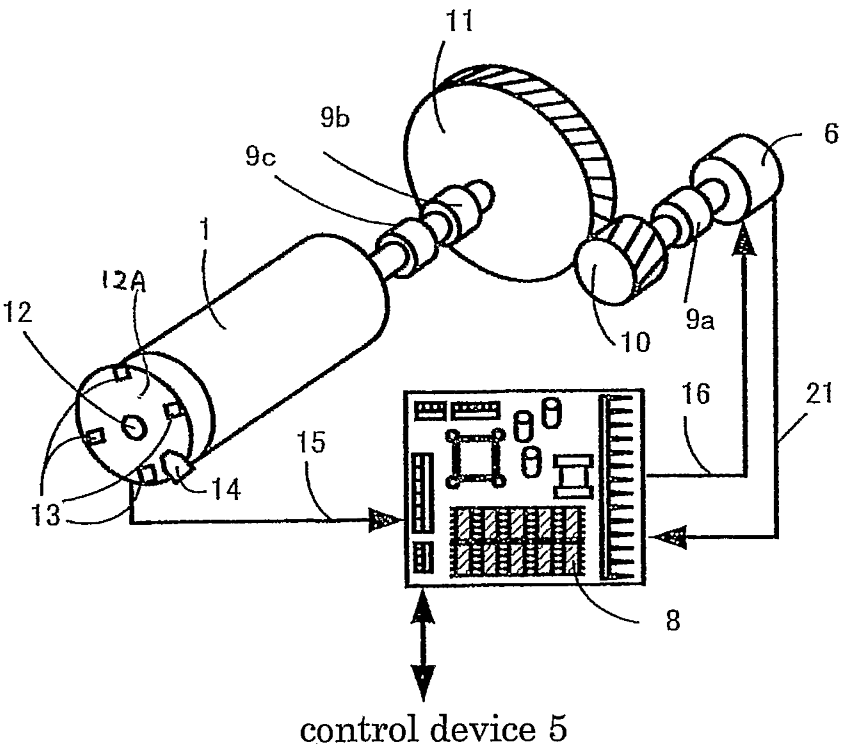
FIG. 7 is a drawing explaining a structure of a photoconductor drum driving control mechanism device of one of the embodiments of the present invention.

A reference signal, Tref, to be a reference corresponding to one-revolution time of the photoconductor drum is generated by the timer in the control device 5 of FIG. 6. The signal is sent to the photoconductor drum driving control device 8. The photoconductor drum driving control device 8 controls as follows. After the arrival of the reference signal Tref, the rotation of the photoconductor drum 1*a* is controlled by increasing and decreasing the photoconductor drum speed, such that the home position in FIG. 15 passes the detector 14 in FIGS. 1A, 1B to become a position of $\theta 1/\omega d$ time. After the arrival of the reference signal Tref, the rotation of the photoconductor drum 1*b* is controlled by increasing and decreasing the photoconductor drum speed, such that the home position passes the detector 14 to become the position of $\theta 2/\omega d$ time. Similarly, the rotation of the photoconductor drums 1*c*, 1*d* is controlled, and the phase of one-revolution period fluctuation of the photoconductor drum is adjusted.

Consequently, the amplitude of one-revolution period fluctuation of the photoconductor drum can be lowered, and the generation of the color shift can be controlled because the phases of the period fluctuations between the photoconductor drums are matched when one-revolution period of the remaining photoconductor drums are fluctuated by control errors and the like. Thus, a higher image quality can be obtained.

Third Embodiment

Figure 26:
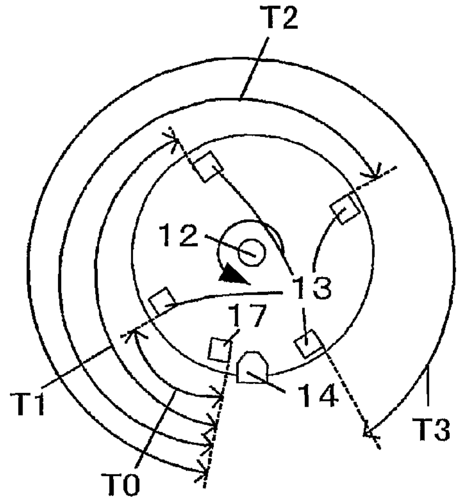
FIG. 26 is a view explaining a relationship between detection times and detection mechanism when providing a reference detected portion.
Figure 27:
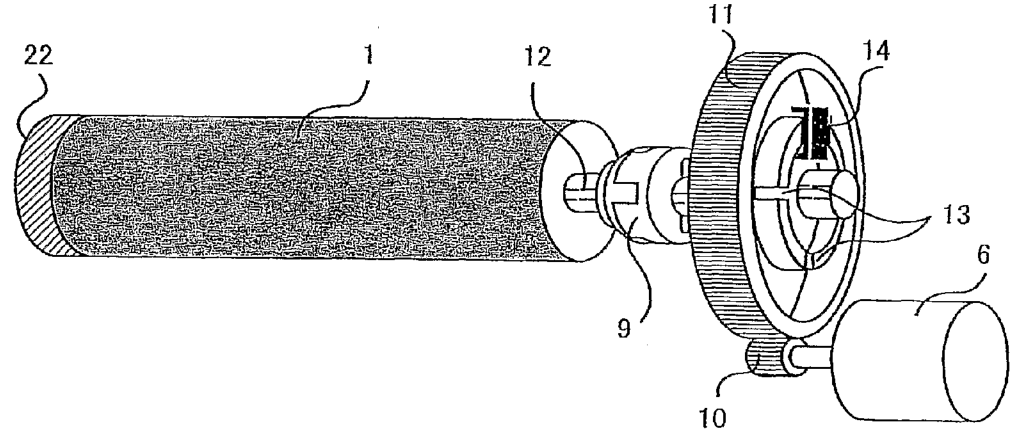
FIG. 27 is a view showing that a coupling is attached to a photoconductor drum driving axis.
Figure 29A:
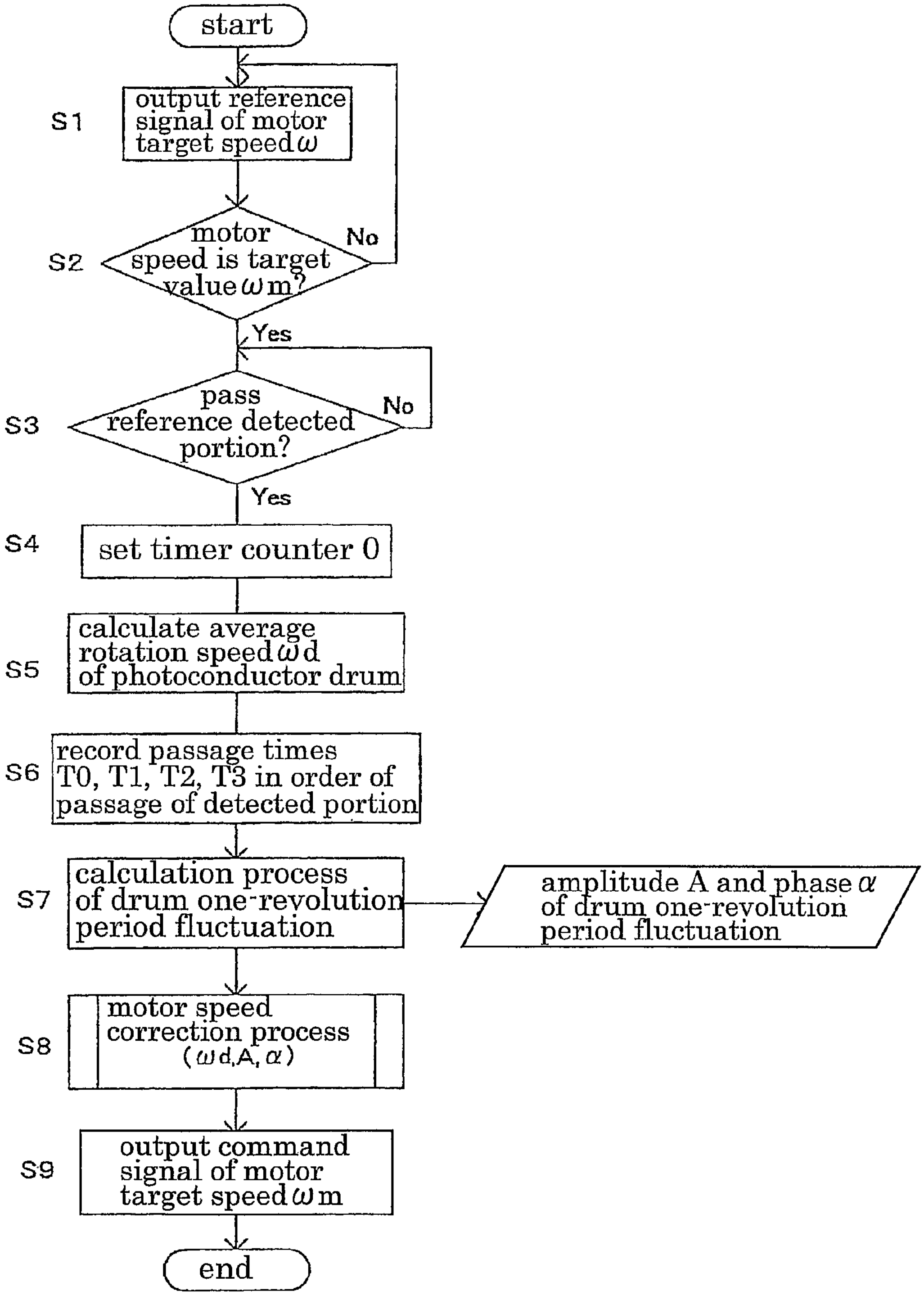
FIG. 29A shows a flow chart of period fluctuation detection/correction when detected reference portions are provided.
Figure 29B:
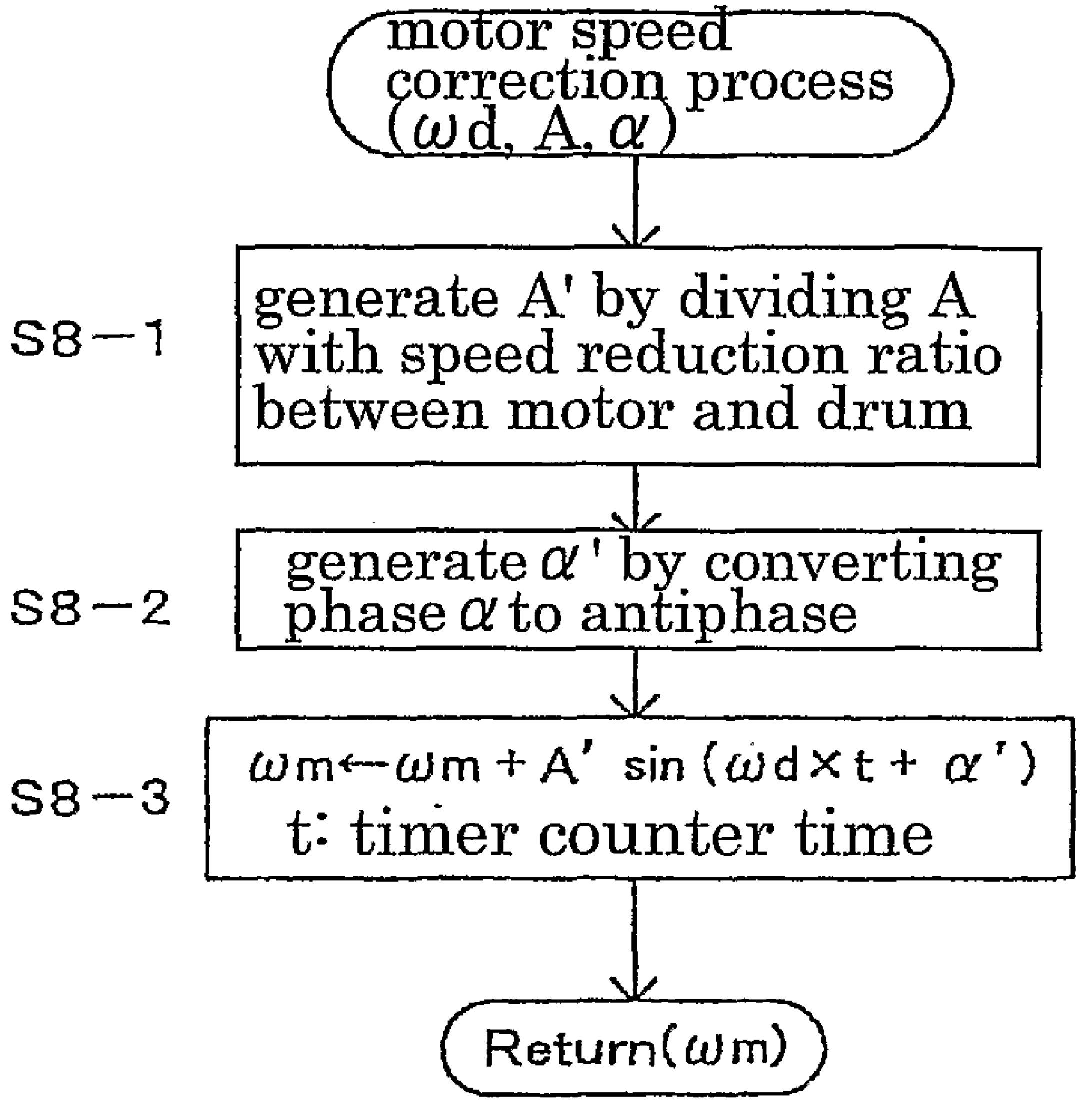
FIG. 29B shows a flow chart of period fluctuation detection/correction when detected reference portions are provided.

In the first embodiment, the home position is set by the structure of the detection mechanism as shown in FIG. 19. In this embodiment, a reference detected portion is provided for setting a home position. The detection mechanism of the reference detected portion comprises the structure shown in FIG. 16, and the data processing thereof is shown in the flowchart in FIGS. 29A, 29B. In FIGS. 29A, 29B, the steps similar to the first embodiment are used till step S5. The passage times of T0, T1, T2 and T3 are stored in the memory for data incorporated in the control device 4, in order of passing the detected portion from the point passing the reference detected portion 17 as shown in FIG. 26 (step S6). The rotation period fluctuation calculating process corresponding to one-revolution of a drum is conducted by using the data of the passage times T0, T1, T2 and T3 (step S7).

The rotation period fluctuation calculating process corresponding to one-revolution of a drum has a function for calculating the amplitude and phase of the rotation period fluctuation corresponding to one-revolution of the photoconductor drum axis. The rotation period fluctuation is generated in the photoconductor drum axis as illustrated in FIG. 8. In the fluctuation components, the amplitude of the ration period fluctuation corresponding to one-revolution of the photoconductor drum axis and the initial phase using the home position as a reference are calculated as A and α, respectively. The calculating process is conducted by solving the following equation.

$$\begin{bmatrix} \sin\left(\frac{\omega(T2-T0)}{2}\right) & \cos\left(\frac{\omega(T2-T0)}{2}\right) \\ \sin\left(\frac{\omega(T3+T1-2T0)}{2}\right) & \cos\left(\frac{\omega(T3+T1-2T0)}{2}\right) \end{bmatrix} \begin{bmatrix} A\cos\alpha \\ A\sin\alpha \end{bmatrix} = \omega \begin{bmatrix} (\pi-\omega(T2-T0))/2\sin\left(\frac{\omega(T2-T0)}{2}\right) \\ (\pi-\omega(T3-T1))/2\sin\left(\frac{\omega(T3-T1)}{2}\right) \end{bmatrix} \quad \text{equation (5)}$$

The above equation (5) can be solved by obtaining the inverse matrix of the matrix of the left-hand side, or by using another numerical calculation method.

Therefore, the amplitude A of the fluctuation component of one-revolution period of the photoconductor drum axis and the phase α having the home position as the reference are obtained. After finishing the calculating process of A and α, a motor speed correction process is performed (step S8). The steps similar to the first embodiment are carried out in the step S8-1 to step S8-3. Then the command signal of the motor rotation target speed ωm is output (step S9).

This method is advantageous in that the process for determining a home position can be omitted, and it is not necessary to secure the storing area for the process.

Fourth Embodiment

In the first embodiment, the optical writing position on the photoconductor drum and the transfer position to a transfer material (paper, intermediate transfer drum, or intermediate transfer belt) are positioned apart by 180 degrees each other. However, FIGS. 3, 4A, 4B, 4C, 4D explain an embodiment when the above structure is not included considering the layout of the entire image forming apparatus.

Figure 3:
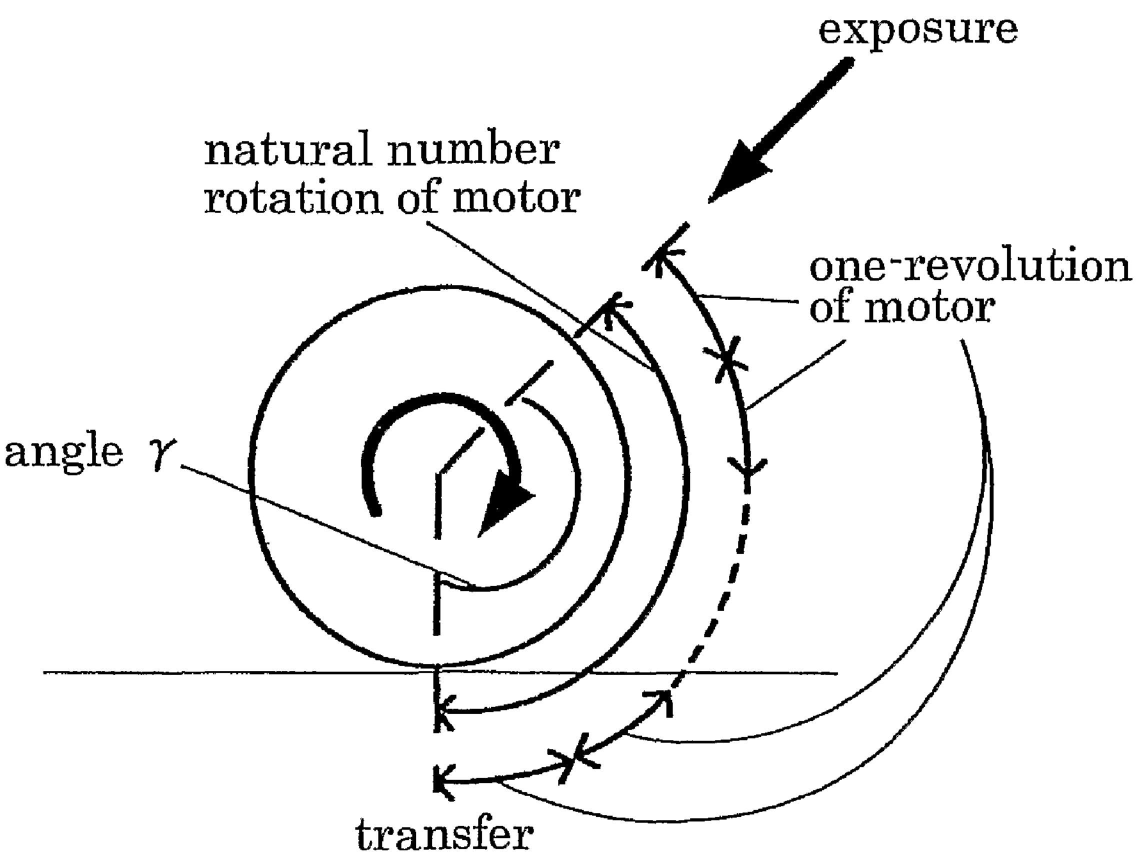
FIG. 3 is an explanation view illustrating a positional relationship between exposure and transfer of the present invention.

As shown in FIG. 3, the image forming apparatus is designed such that the photoconductor drum reaches from the exposure position to the transfer position by natural number rotation of motor. This is because the phases of the period fluctuation of the motor rotation speed are matched in the exposure position and the transfer position. The displacement of pixel to be transferred can be reduced by this phase matching. This phase matching is performed by the detection. More particularly, when the angle of this exposure position and the transfer position is γ, the angles of the detection zones constructed by the detected portions are set to be γ, such that the period fluctuation of the motor rotation speed have no influence on the detection of the rotation period fluctuation corresponding to one-revolution of the drum. Since the period fluctuation of the motor rotation speed can be constantly detected with the matched phase, it is possible to detect without including the period fluctuation of the motor rotation speed in terms of the detection. In this case, the structures of the detected portions include FIGS. 4A, 4B, 4C, and 4D. The structures shown in FIGS. 4A, 4B include the detected portions as the both ends of the edge of the rotating plate. The structures of FIGS. 4C, 4D include the detected portions as one side of the edge of rotating plate.

When the above detectors is used, the steps for detecting the amplitude and the phase of the rotation period fluctuation corresponding to one-revolution of the photoconductor drum, the driving control method, and the method for matching phases between the photoconductor drums are similar to those described in the first and second embodiments. The rotation period fluctuation can be calculated by the calculating formula using π in the equation (1) as γ.

Figure 40:
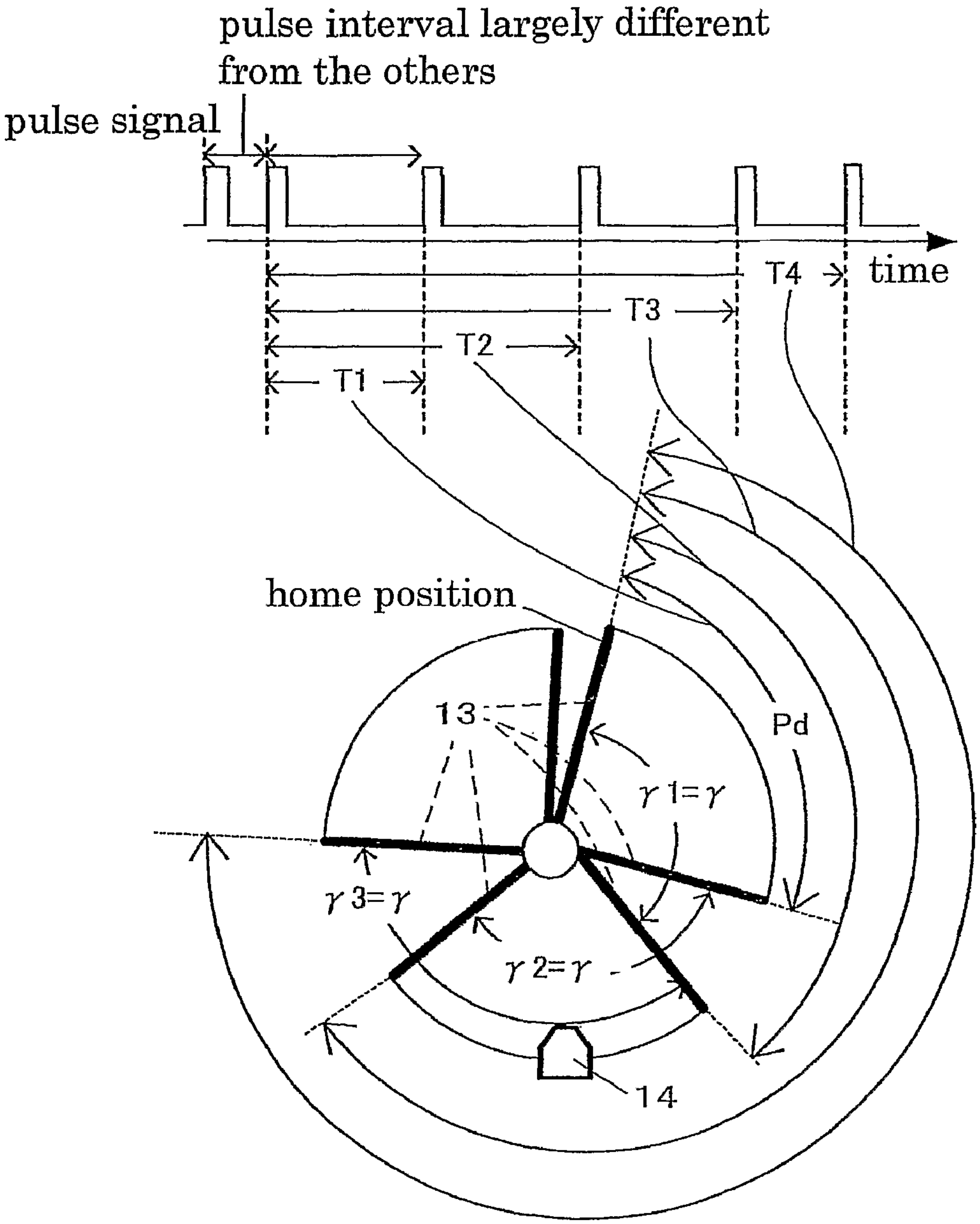
FIG. 40 is a view explaining a relationship between detection mechanism having detection zones which are not positioned by 180 degrees, detection zones, and detection times.

The home position illustrated in FIG. 40 can be determined and detected because the pulse interval of the zone detected by the detector 14 is different from the pulse interval of another zone.

In FIG. 40, the time passing the angle $\gamma 1=\gamma$ from the home position is T2, and the time that the angle $\gamma 2=\gamma$ passes from the home position is T3−T1. The time detections of these intervals have no impact of the period fluctuation of the motor rotation speed.

If the time T3+T1 can be detected with high accuracy, the detection accuracy can be further improved. In FIG. 40, the angle Pd is also structured to be the rotation angle Pd of the photoconductor drum with the natural number rotation of motor, such that the rotation angle Pd also has no impact of the motor rotation period fluctuation. This passage time is T1. T3+T1=(T3−T1)+2T1. The first term of the right-hand side is the time passing the angle γ2. The second term is the time passing the angle Pd. Accordingly, the time T3+T1 can also be detected with high accuracy. Namely, the equation (1) indicated in the first embodiment becomes the following equation (6).

$$\begin{bmatrix} \sin\left(\frac{\omega T2}{2}\right) & \cos\left(\frac{\omega T2}{2}\right) \\ \sin\left(\frac{\omega(T3+T1)}{2}\right) & \cos\left(\frac{\omega(T3+T1)}{2}\right) \end{bmatrix} \begin{bmatrix} A\cos\alpha \\ A\sin\alpha \end{bmatrix} = \omega \begin{bmatrix} (\gamma-\omega T2)/2\sin\left(\frac{\omega T2}{2}\right) \\ (\gamma-\omega(T3-T1))/2\sin\left(\frac{\omega(T3-T1)}{2}\right) \end{bmatrix} \quad \text{equation (6)}$$

The rotation period fluctuation can be calculated by the calculation formula using π in the equation (5) as γ. More particularly, the equation (5) indicated in the third embodiment becomes the following equation (7).

$$\begin{bmatrix} \sin\left(\frac{\omega(T2-T0)}{2}\right) & \cos\left(\frac{\omega(T2-T0)}{2}\right) \\ \sin\left(\frac{\omega(T3+T1-2T0)}{2}\right) & \cos\left(\frac{\omega(T3+T1-2T0)}{2}\right) \end{bmatrix} \begin{bmatrix} A\cos\alpha \\ A\sin\alpha \end{bmatrix} = \omega \begin{bmatrix} (\gamma-\omega(T2-T0))/2\sin\left(\frac{\omega(T2-T0)}{2}\right) \\ (\gamma-\omega(T3-T1))/2\sin\left(\frac{\omega(T3-T1)}{2}\right) \end{bmatrix} \quad \text{equation(7)}$$

Although a general structure of which the angle between the detected portions is not 180 degrees is used, the amplitude and the phase of the rotation period fluctuation corresponding to one-revolution of the drum can be detected by calculating the equation 6 or the equation 7 instead of calculating the equation 1 or the equation 5.

Figure 4A:
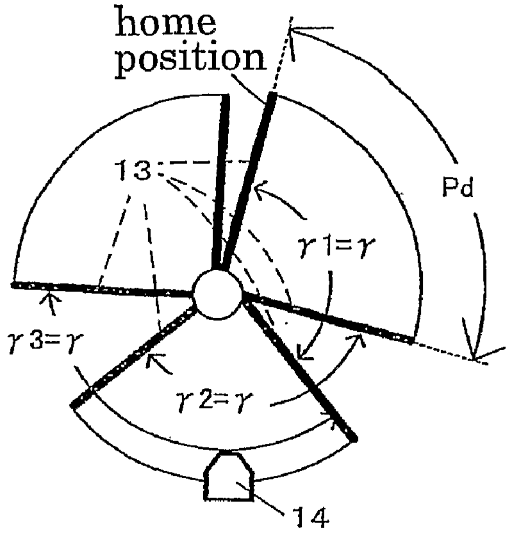
FIG. 4A is a drawing showing a structure of detected portions used to detect a rotation period fluctuation of the present invention, and showing a detecting portion of fan-shaped member.
Figure 4B:
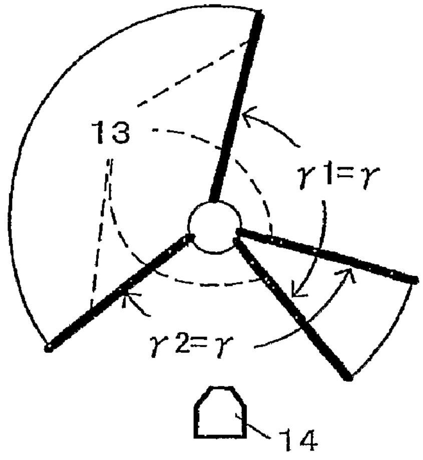
FIG. 4B is a drawing showing a structure of detected portions used to detect a rotation period fluctuation of the present invention, and showing a detecting portion of fan-shaped member.
Figure 4C:
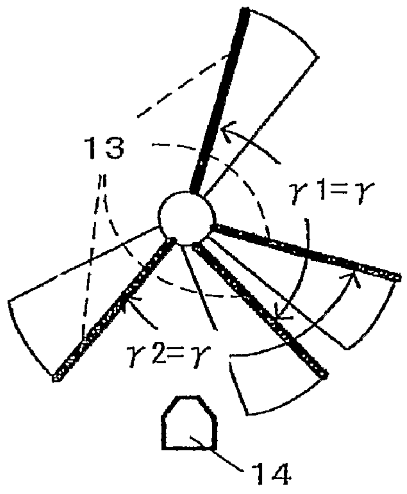
FIG. 4C is a drawing showing a structure of detected portions used to detect a rotation period fluctuation of the present invention, and showing a detecting portion of fan-shaped member.
Figure 4D:
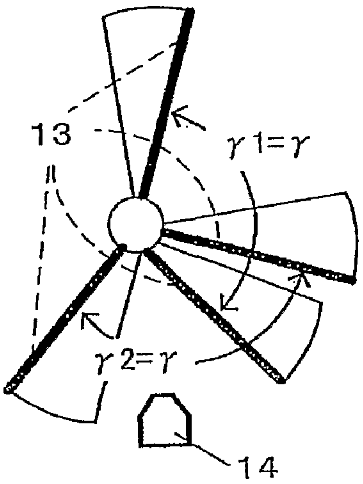
FIG. 4D is a drawing showing a structure of detected portions used to detect a rotation period fluctuation of the present invention, and showing a detecting portion of fan-shaped member.

In FIG. 4A, with the structure that the rotation angle of the photoconductor drum does not become Pd when the motor rotates by natural number times, there is a detection error by motor rotation period fluctuation in the time passing the rotation angle Pd. A method for correcting this error will be explained. At first, by using the times passing the angle γ1 and the angle γ2 in FIG. 4A, the rotation period fluctuation corresponding to one-revolution of drum is obtained by the equation (6). Next, the rotation period fluctuation corresponding to one-revolution of drum is obtained by using the time passing the angle γ2 and the angle γ3. If the passage time from the home position to the angle γ3 is T4, the rotation period fluctuation can be obtained by the equation (8) below.

$$\begin{bmatrix} \sin\left(\frac{\omega(T3-T1)}{2}\right) & \cos\left(\frac{\omega(T3-T1)}{2}\right) \\ \sin\left(\frac{\omega(T4+T2-2T1)}{2}\right) & \cos\left(\frac{\omega(T4+T2-2T1)}{2}\right) \end{bmatrix} \begin{bmatrix} A\cos\alpha \\ A\sin\alpha \end{bmatrix} = \omega \begin{bmatrix} (\gamma-\omega(T3-T1))/2\sin\left(\frac{\omega(T3-T1)}{2}\right) \\ (\gamma-\omega(T4-T2))/2\sin\left(\frac{\omega(T4-T2)}{2}\right) \end{bmatrix} \quad \text{equation (8)}$$

The times T2, T3−T1 and T4−T2 passing the angle γ have a few detection errors by the rotation period fluctuation of motor. However, the second terms in T3+T1=(T3−T1)+2T1 and T4+T2−2T1=(T4−T2)+2(T2−T1) include the detection errors by the rotation period fluctuation of motor. Since sum of the zone detecting the time T2−T1 and the zone detecting the time T1 is T2 time of the angle γ1 of the detection zone, the sum of the detection error of the time T2−T1 and the detection error of the time T1 becomes zero. The errors can be, therefore, reduced by obtaining the average value of the rotation period fluctuations obtained by the equation (6) and the equation (8) (½ of sum of the rotation period fluctuations obtained by the both equations).

Fifth Embodiment

In the embodiments from 1 to 4, the image displacement can be controlled by detecting and controlling the rotation period fluctuation of one-revolution period of the driven gear 11 of the large diameter gear disposed in the photoconductor axis. In addition, the speed difference fluctuation between the photoconductor and the transfer body when transferring from the photoconductor drum to the transfer body (transfer paper, intermediate transfer drum and intermediate transfer belt) can be reduced by rotating the photoconductor drum at a fixed speed; thus collapse of image (thickening image) at the time of transferring can be curved.

However, there may be a case that the rotation period fluctuation corresponding to one-revolution of the drive gear 10 generates collapse of image (thickening image) by the eccentricity and cumulative pitch error of wheel tooth of the drive gear 10. Accordingly, the detection and control of the rotation period fluctuation of one-revolution period of the drive gear 10 is very effective for improving a high image quality.

An embodiment for detecting and controlling a rotation period fluctuation corresponding to one-revolution of a gear disposed on a photoconductor drum axis and other different gears will be described.

Here, the period fluctuation of one-revolution of photoconductor drum is eliminated by the method represented in the first embodiment. Next, the phase and amplitude of the rotation period fluctuation possessed by another transfer mechanism such as a motor axis gear are detected to conduct a correction control. This method is explained by using a rotating plate of an edge detection type shown in FIG. 5. The rotating plate in FIG. 5 includes the angle γ1 of the first zone and the angle γ2 of the second zone comprising the angle γ that the edge interval between of the front side edges in a plurality of different fan-shaped members corresponds to the half-revolution of photoconductor drum. In addition, the rotating plate includes the first zone, angle β1 and the second zone, angle β2 for detecting the motor rotation period fluctuation comprising the angle β that the edge interval between the fan-shaped members correspond to the motor axis half-revolution. The angles γ1 and γ2 are for detecting the amplitude and the phase of the rotation period fluctuation corresponding to one-revolution of the photoconductor drum as described in the first and third embodiments. The angles may coincide with the angle by the exposure position and the transfer position. Moreover, the detection accuracy is improved by conforming the rotation angle of natural number times of the number of motor rotation to the angle γ, and further to the angle γ/2 in the present embodiment.

Figure 5:
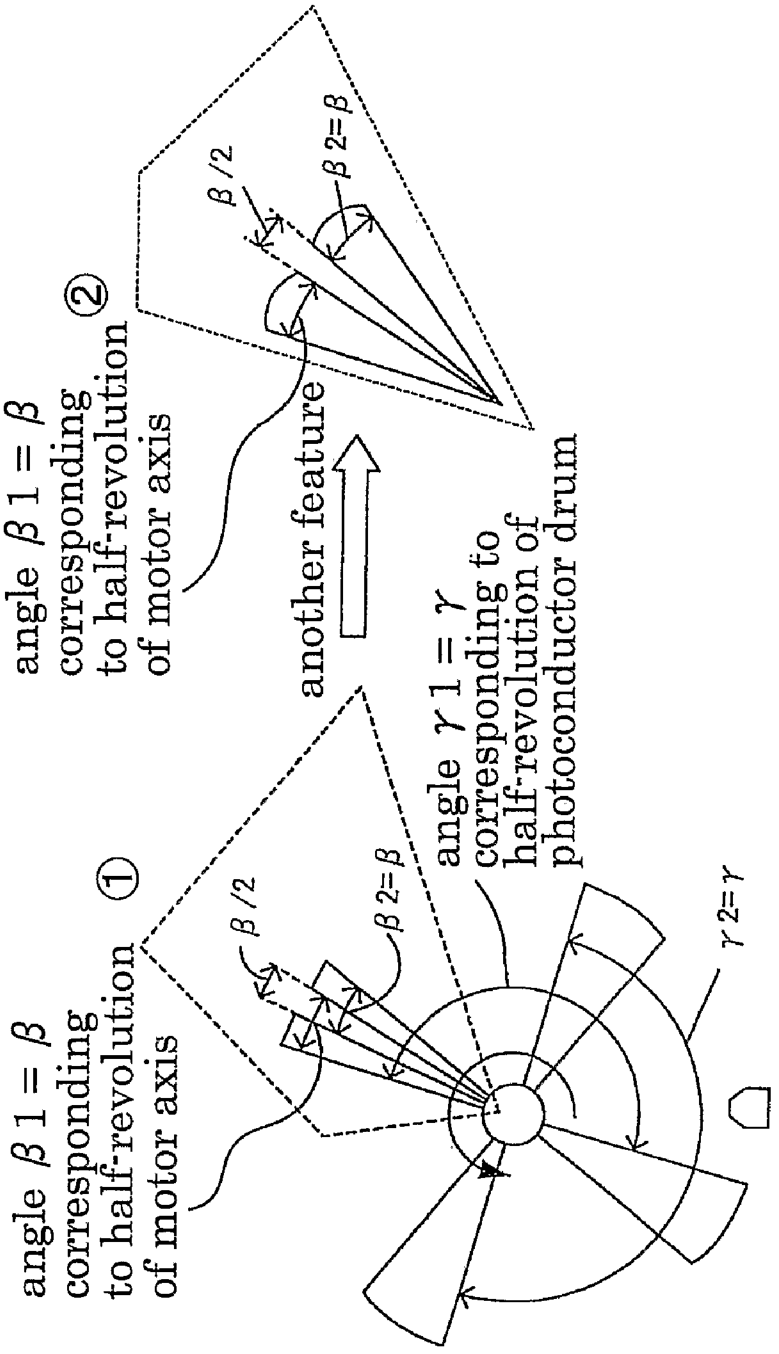
FIG. 5 is an explanation view illustrating a structure of detected portions used to detect two kinds of rotation period fluctuations of the present invention.
Figure 25:
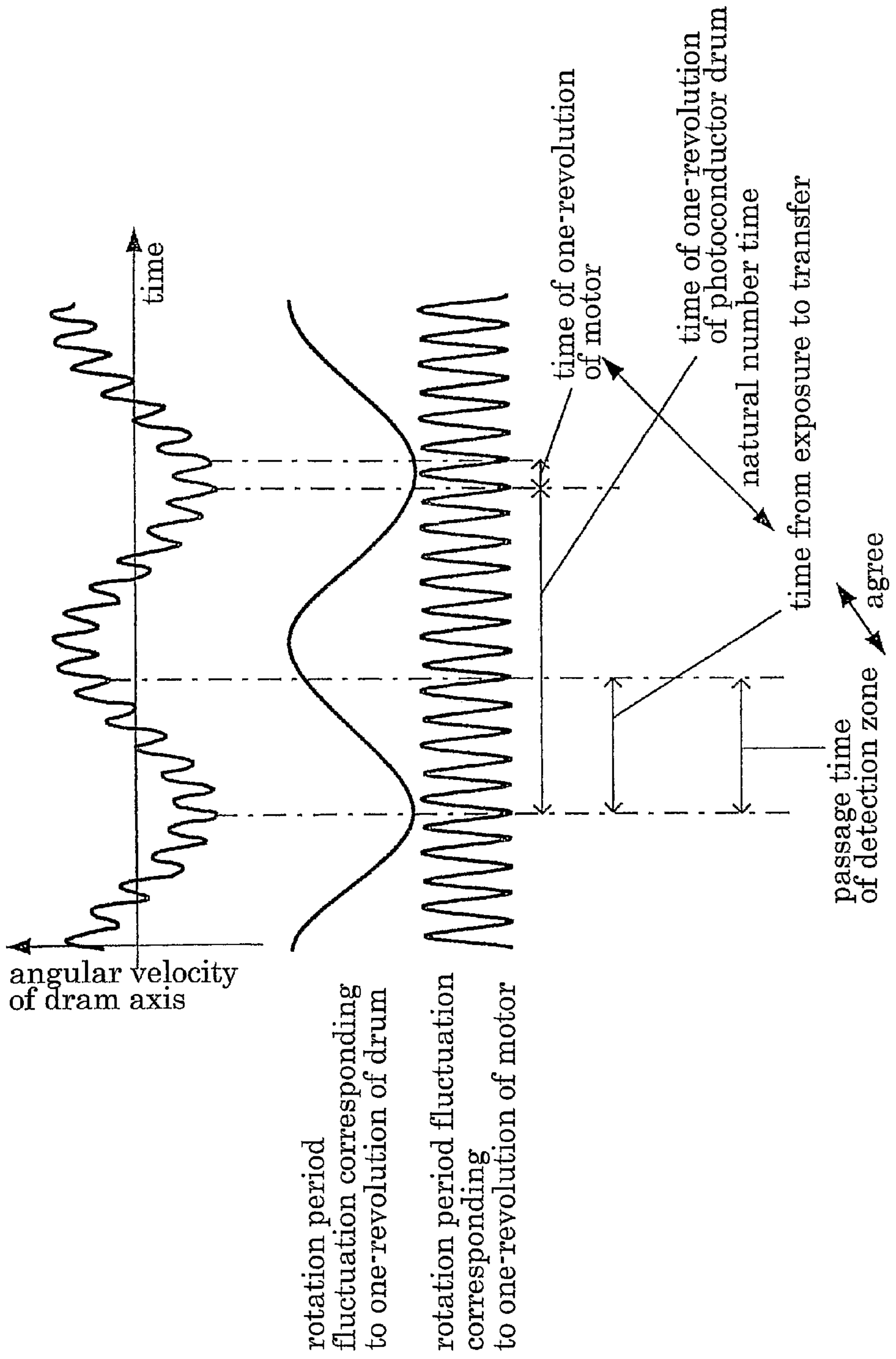
FIG. 25 is a view explaining a speed fluctuation period when the passage time of the detecting zone is matched to the time from the exposure to the transfer.

On the contrary, the angles β1, β2 and the angle β/2 in FIG. 5 are for detecting the amplitude and the phase of the rotation period fluctuation corresponding to one-revolution of a motor axis. In this case, the angles γ and β correspond to the half-revolution of the photoconductor drum and the motor axis, respectively, in order to obtain the highest detection sensitivity. In the method for driving the large diameter gear by providing it on the same axis of the photoconductor drum, the angles γ and β vary widely. Therefore, it can be easily determined which rotation angle is detected. More particularly, it is possible to determine which angle is measured by the time interval because the rotation speed does not vary widely. The detection of the angle can be, therefore, solved by the signal processing without adding a special mechanism. After the rotation period fluctuation corresponding to one-revolution of the photoconductor drum has been corrected, the major trigger of the rotation period fluctuation is the rotation period fluctuation corresponding to one-revolution of a motor axis; thus, the rotation period fluctuation corresponding to one-revolution of a motor axis can be detected and controlled with high accuracy. FIG. 25 shows this relationship.

The above relationships that one-revolution period of a motor axis is ½ revolution period of the photoconductor drum (angle γ) or 1/natural number of ¼ rotation period (angle γ/2) become the relationships, β×N=π, or β×N=π/2 (N: natural number), when represented by the mathematical formulas.

In FIG. 5, two structures of the detection zones of angles β1, β2 or the angle β/2 are shown. It can be practicable if the detection zones of angles β1, β2 or the angle β/2 can be structured. Moreover, in FIG. 5, a pair of the detection zones of angles β1, β2 or the angle β/2 is only disposed; however, the detection accuracy can be improved by providing multiple pairs of detection zones to obtain multiple pairs of motor rotation period fluctuations and by averaging the obtained multiple pairs of motor rotation period fluctuation.

In the present embodiment, the rotation period fluctuation corresponding to one-revolution of the motor axis (drive roller) was explained; however, this method is practicable with respect to torque ripple. The torque ripple is periodical fluctuation of torque generating while the motor makes one-revolution. Therefore, the periodical fluctuation of torque ripple can be detected to be corrected and controlled by further constructing the fan-shaped members on the circular plate in FIG. 5, such that the first and second zones or the phase difference zone of these zones corresponding to the half of this fluctuation period obtain the structure to be the half of this zone.

In the present embodiment, the photoconductor drum is driven by a pair of gears as shown in FIG. 7. However, the photoconductor drums can be driven when an intermediate gear is provided by increasing this gear mechanism. FIG. 24 shows this driving mechanism. In this case, the period fluctuation of the intermediate gear can be detected to be corrected and controlled by further constructing the fan-shaped members on the rotating plate in FIG. 5, such that the first and second zones corresponding to the half of the fluctuation period of the intermediate gear or the phase difference of these zones obtain the structure to be the half of this zone.

Sixth Embodiment

The above embodiments were explained based on the assumption that the rotating plate axis having the detected portions and the photoconductor drum rotation axis are coaxially provided. When the rotating plate includes the installation eccentricity, the times that the detected portions pass the detector include the passage time error by the installation eccentricity. This time error is disadvantageous in that the detection accuracy is deteriorated and the effect of correcting control is decreased. In the present embodiment, a method for using two detectors is explained for correcting the installation eccentricity.

Figure 35:
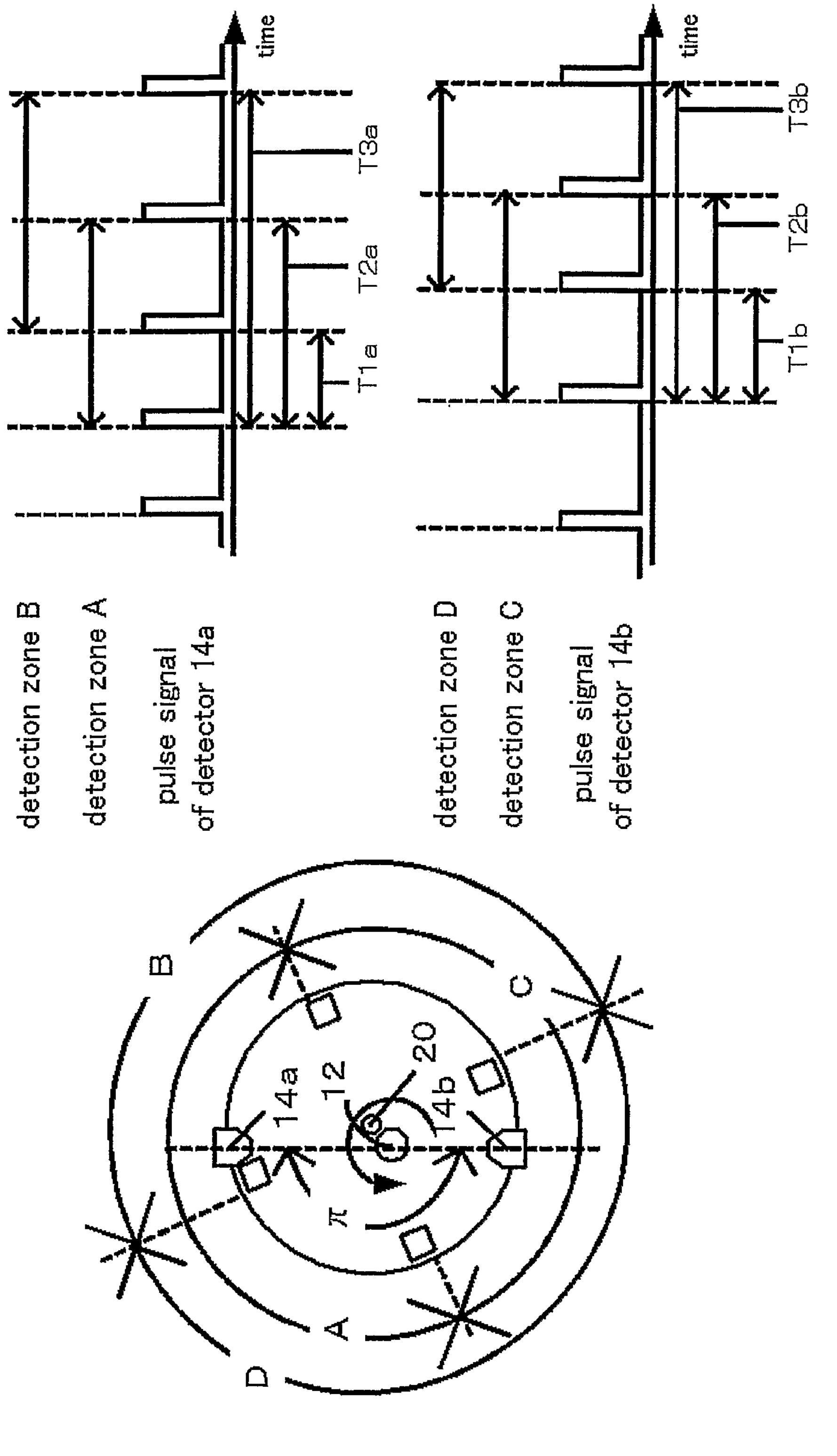
FIG. 35 is a view describing a relationship passage times and detection zones detected by respective two detectors.
Figure 36:
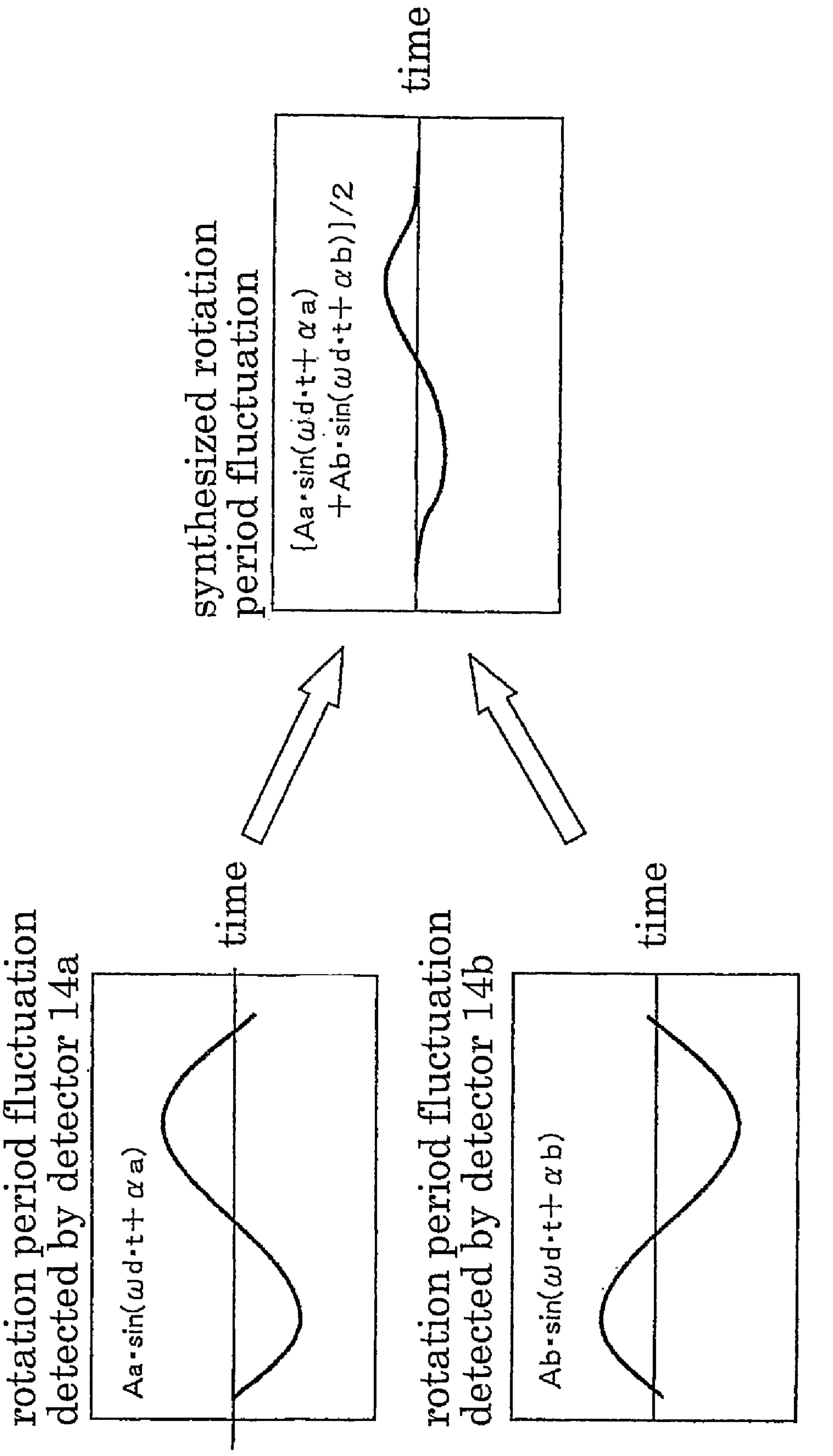
FIG. 36 is a view explaining a method for synthesizing rotation period fluctuations detected by respective two detectors.

There is a method for correcting the passage time as a first method. In this case, it will be described that detectors 14*a*, 14*b* are installed in the positions facing to the photoconductor drum rotation axis as shown in FIG. 10. As illustrated in FIG. 35, when the passage times are obtained, the passage times corrected at this time, T1, T2 and T3 are as follows.

$$T1=(T1a+T1b)/2$$

$$T2=(T2a+T2b)/2$$

$$T3=(T3a+T3b)/2$$

These corrected passage times T1, T2 and T3 are assigned to the equation (1). By this assignment, the influence of rotating plate installation eccentricity is corrected; thus, the rotation period fluctuation of the photoconductor drum rotating axis can be detected with high accuracy.

There is a method for correcting a period fluctuation by synthesizing period fluctuations obtained by respective detectors, as a second method. In this case, it will be explained when the respective detectors 14*a*, 14*b* detect the following rotation period fluctuation, respectively.

$$14a: Aa\cdot\sin(\omega d\cdot t+\alpha a)$$

$$14b: Ab\cdot\sin(\omega d\cdot t+\alpha b)$$

Here, the rotation period fluctuation in which the rotating plate installation eccentricity has been corrected is as follows.

$$\{Aa\cdot\sin(\omega d\cdot t+\alpha a)+Ab\cdot\sin(\omega d\cdot t+\alpha b)\}/2 \qquad \text{equation (9)}$$

The rotation period fluctuation of the photoconductor drum axis in which the influence of the rotating plate installation eccentricity has been corrected can be obtained by calculating the equation (9).

Figure 38:
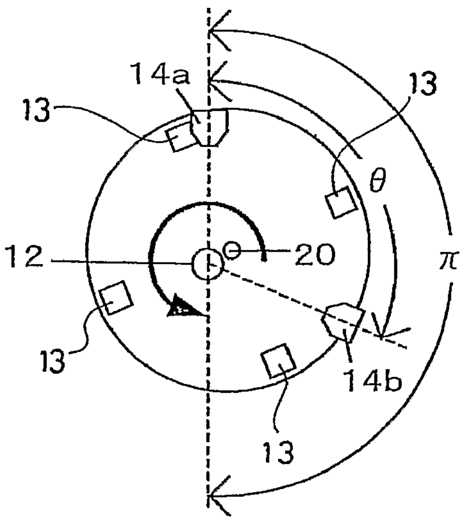
FIG. 38 is a view explaining a structure of two detectors when the detectors are facing each other.
Figure 39:
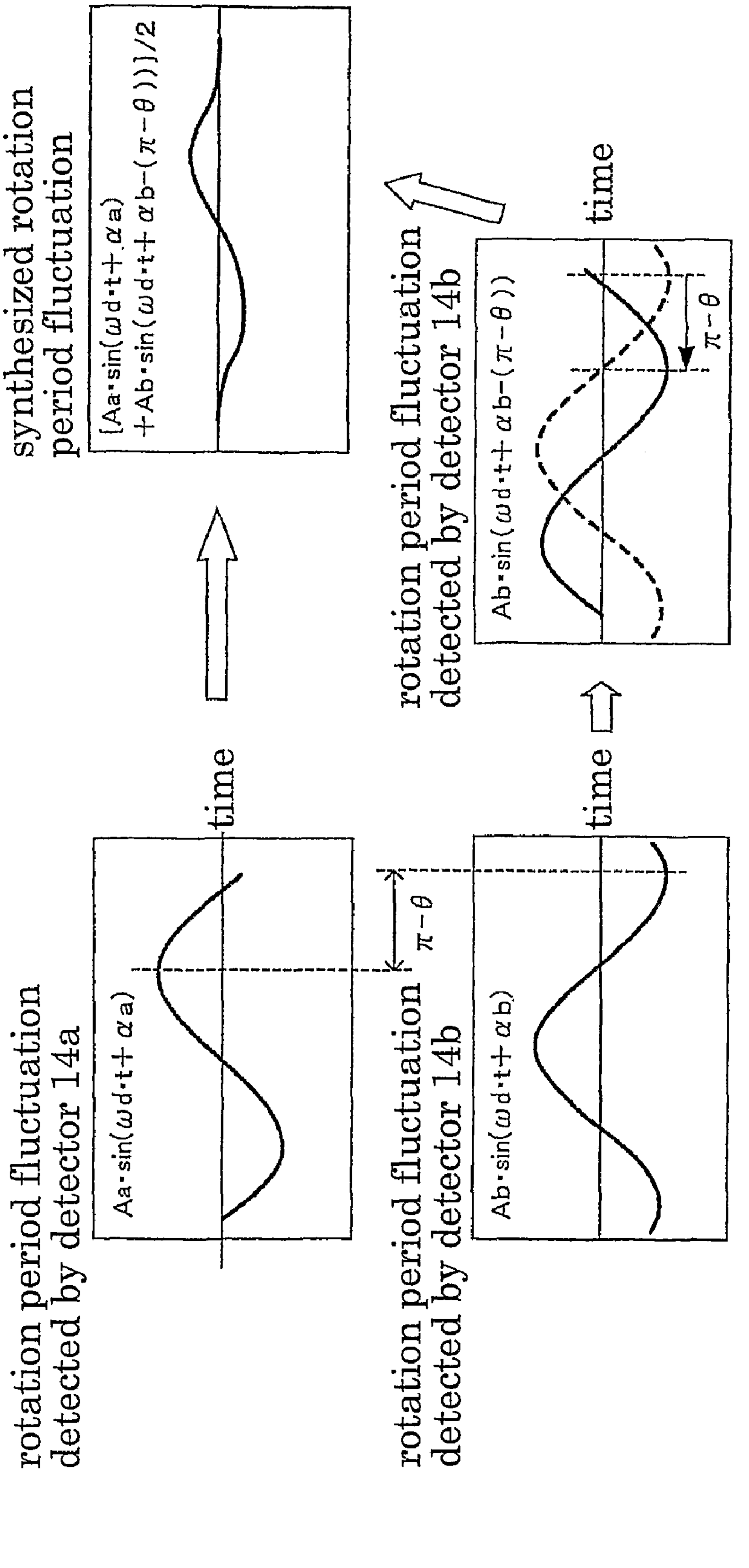
FIG. 39 is a view explaining a method for correcting installation eccentricity of a rotating plate when detectors are not facing each other.

In addition, a method for correcting rotating plate installation eccentricity when the two detectors are not faced each other will be described. In this case, it will be explained when the detectors 14*a*, 14*b* are disposed apart by the angle θ around the rotation shaft 12 of the photoconductor drum as shown in FIG. 38, not in the positions that the detected portions 14*a* and 14*b* are faced each other. In this case, the influence of the rotating plate installation eccentricity is that the phase of θ is mismatched. Accordingly, the influence of the rotating plate installation eccentricity can be corrected by synthesizing the rotation period fluctuation as illustrated in FIG. 39.

At first, the phase of the rotation period fluctuation detected by the detector 14*b* in the rotation period fluctuations $Aa\cdot\sin(\omega d\cdot t+\alpha a)$, $Ab\cdot\sin(\omega d\cdot t+\alpha b)$ detected by the detectors 14*a*, 14*b* is mismatched by π−θ to generate the rotation period fluctuation of $Ab\cdot\sin(\omega d\cdot t+\alpha b-(\pi-\theta))$.

Next, the rotation period fluctuation of the detector 14$a$, $Aa \cdot \sin(\omega d \cdot t+\alpha a)$ and the rotation period fluctuation of the detector 14$b$, $Ab \cdot \sin(\omega d \cdot t+\alpha b-(\pi-\theta))$ mismatched $\pi-\theta$ phase are synthesized and are made to be one-half. As a result, the rotation period fluctuation becomes as follows.

$$\{Aa \cdot \sin(\omega d \cdot t+\alpha a)+Ab \cdot \sin(\omega d \cdot t+\alpha b-(\pi-\theta))\}/2 \quad \text{equation (10)}$$

The rotation period fluctuation of the photoconductor drum axis in which the influence of the rotating plate installation eccentricity has corrected can be obtained by calculating the equation (10).

Seventh Embodiment

In the above embodiments, a series of the detection and the correction control was explained. The present embodiment is performed by repeating the detection and the correction control. This is effective when the rotation period fluctuation changes with time. This change over time is considered when the eccentricity state is changed by the backlash of the connected portion between the photoconductor drum rotation axis and the drive axis.

Figure 31A:
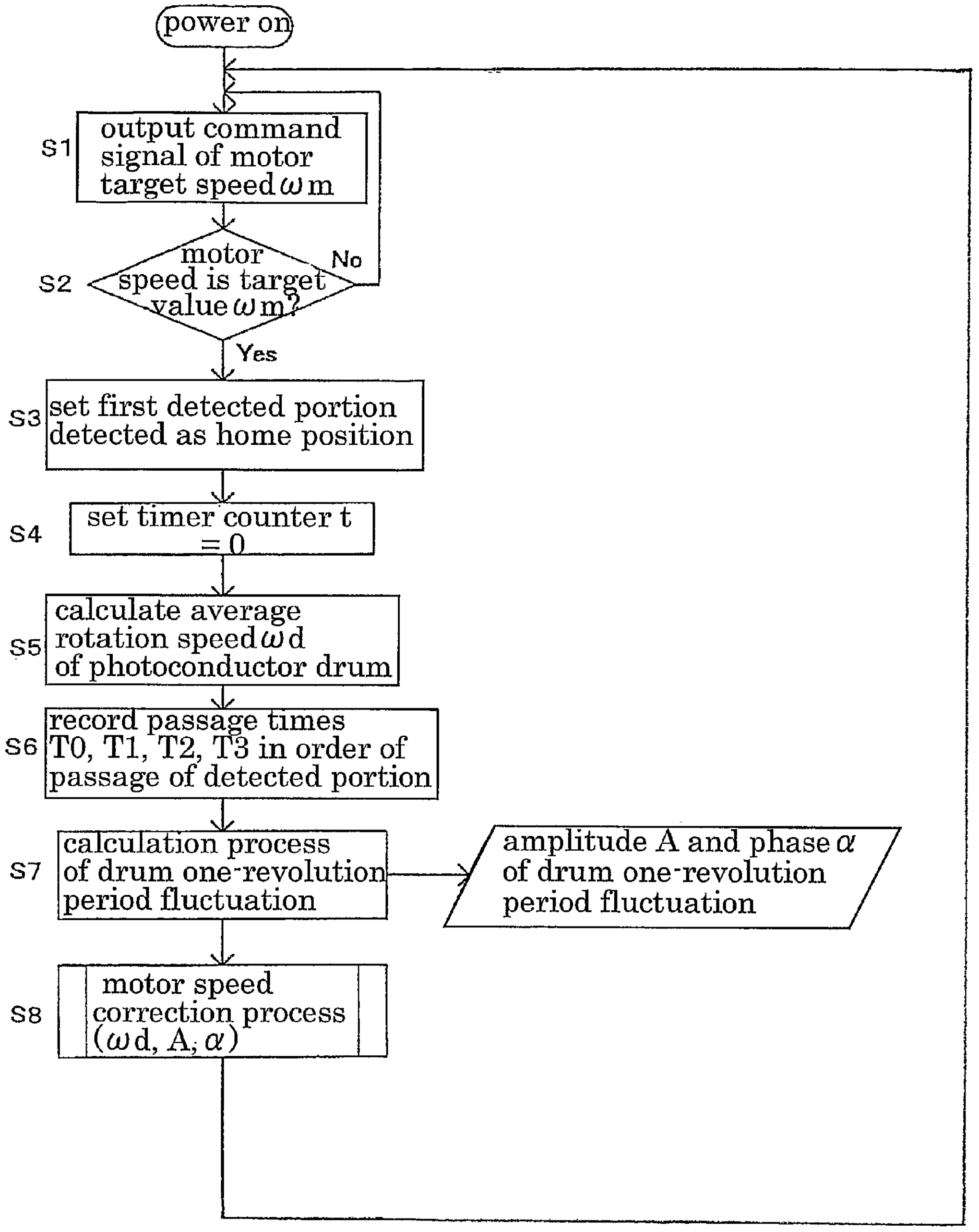
FIG. 31A shows a flow chart of a sequential period fluctuation detection/correction control.
Figure 31B:
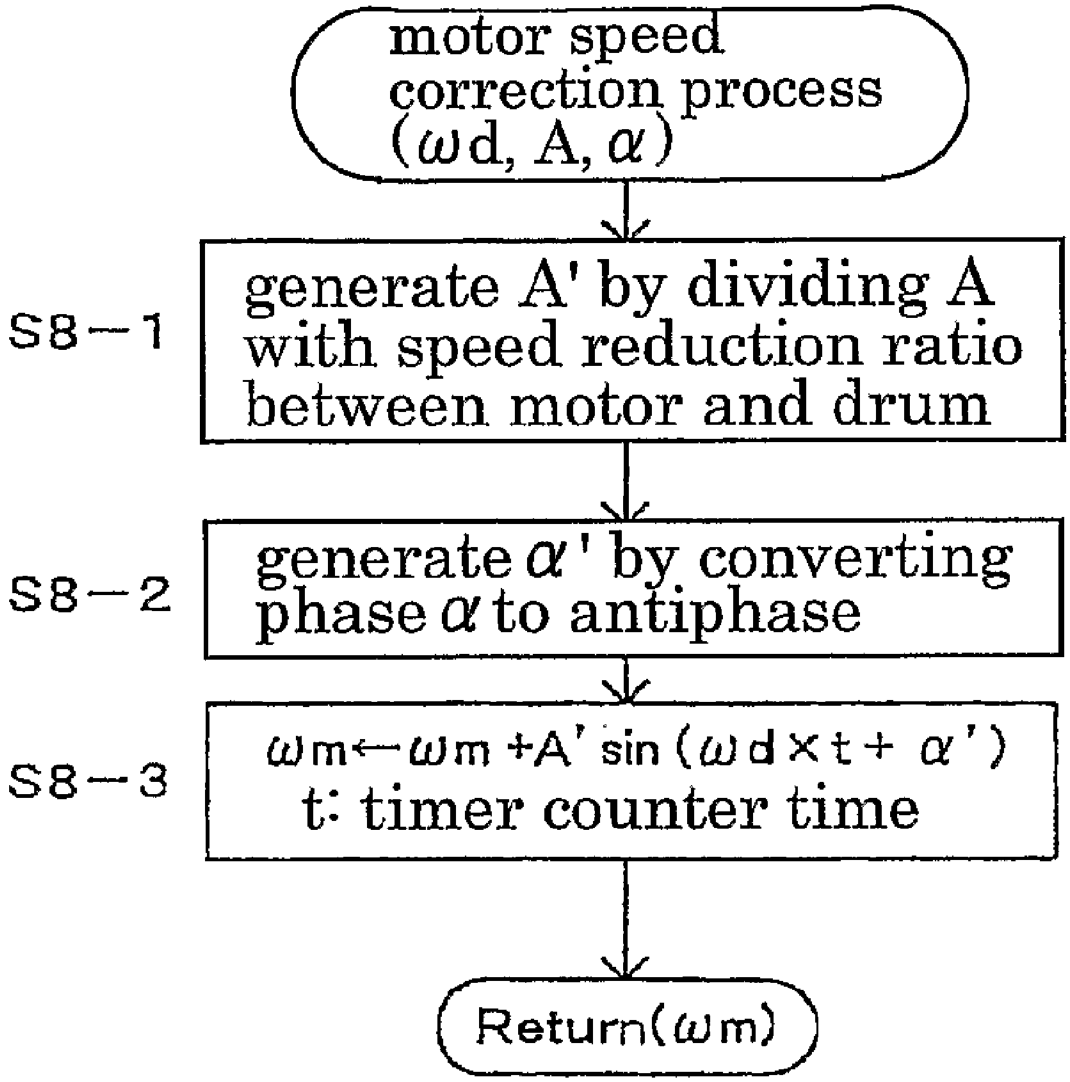
FIG. 31B shows a flow chart of a sequential period variation detection/correction control.

A method for determining a motor target speed will be explained in sequential correction control. The sequential detection and control of the first embodiment can be achieved along the flowchart shown in FIG. 31, without changing the mechanical structure. In this case, the motor target speed synthesizes the previously corrected motor target speed and the correction motor target speed generated this time.

The sequential detection and correcting control by repeating is not only conducted while an image is being formed, but also is conducted constantly or in a fixed interval.

The invention claimed is:

1. A rotor driving control device, comprising:

a motor;

a transfer mechanism for transferring a turning force of the motor;

a rotor to be rotated and driven by the turning force of the motor, and connected to the transfer mechanism;

a plurality of detected portions circularly disposed around a rotation axis of the rotor;

a detector to detect the detected portions;

a passage time detecting device configured to detect passage times that a first zone and a second zone pass the detector, based on a signal from the detector at the time of rotating the rotor, when the first zone having two detected portions of the plurality of detected portions on the both ends is set, and the second zone having the detected portions on the both ends and at least one end being different from the detected portion of the first zone is set;

an amplitude and phase generating device configured to generate an amplitude and a phase of a rotation period fluctuation regarding a desired period of the rotor based on the passage times detected by the passage time detecting device; and a rotation control device configured to control the rotation of the motor to decrease the rotation period fluctuation based on the amplitude and the phase generated by the amplitude and phase generating device.

2. The rotor driving control device according to claim 1, wherein the passage time detected by the passage time detecting device is natural number times of the rotation period of the motor or the transfer mechanism.

3. The rotor driving control device according to claim 1, wherein the passage time detected by the passage time detecting device is a half-period of the rotation period fluctuation regarding the desired period of the rotor, and a phase difference of each zone adjacent each other in the respective zones is set to be mismatched by ¼ period of the rotation period fluctuation.

4. The rotor driving control device according to claim 1, wherein the amplitude and phase generating device generates the amplitude and the phase of the rotation period fluctuation by using any detected portion of the plurality of detected portions as a reference point.

5. The rotor driving control device according to claim 1, wherein the rotation control device controls the rotation of the motor by using any detected portion of the plurality of detected portions as a reference point.

6. The rotor driving control device according to claim 1, wherein the rotation control device controls the rotation of the motor by using any detected portion of the plurality of detected portions as a reference point.

7. The rotor driving control device according to claim 1, wherein the detected portions are symmetrically disposed in two positions with respect to the rotation axis of the rotor.

8. The rotor driving control device according to claim 1, wherein the rotation axis of the rotor is provided with a large diameter gear having a diameter larger than an external diameter of the rotor as a part of the transfer mechanism.

9. The rotor driving control device according to claim 8, wherein the detected portion is disposed on the large diameter gear.

10. The rotor driving control device according to claim 1, wherein the detected portion is disposed on a rotating plate provided in the rotation axis of the rotor.

11. The rotor driving control device according to claim 1, wherein the detected portion is disposed on the rotor.

12. The rotor driving control device according to claim 1, wherein the rotation period fluctuation is corrected and controlled by sequentially generating the amplitude and the phase of the rotation period fluctuation regarding the desired period of the rotor with the amplitude and phase generating device.

13. An image forming apparatus, wherein the rotor driving control device according to claim 1 is mounted, and a photoconductor drum is provided as the rotor.

14. The image forming apparatus according to claim 13, wherein the passage time detected by the passage time detecting device conforms to a time required from an exposure to a transfer on the photoconductor drum.

* * * * *